US012719175B2

(12) United States Patent
Qin et al.

(10) Patent No.: US 12,719,175 B2
(45) Date of Patent: Aug. 25, 2026

(54) ANTENNA STRUCTURE AND ELECTRONIC DEVICE

(71) Applicant: VIVO MOBILE COMMUNICATION CO., LTD., Guangdong (CN)

(72) Inventors: Yue Qin, Guangdong (CN); Yijin Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 30 days.

(21) Appl. No.: 18/900,790

(22) Filed: Sep. 29, 2024

(65) Prior Publication Data

US 2025/0023253 A1 Jan. 16, 2025

Related U.S. Application Data

(63) Continuation of application No. PCT/CN2023/085014, filed on Mar. 30, 2023.

(30) Foreign Application Priority Data

Apr. 1, 2022 (CN) ........................ 202210348898.6

(51) Int. Cl.
*H01Q 1/24* (2006.01)
*H01Q 1/52* (2006.01)
(Continued)

(52) U.S. Cl.
CPC ............... *H01Q 15/24* (2013.01); *H01Q 1/52* (2013.01); *H01Q 9/0478* (2013.01)

(58) Field of Classification Search
CPC ............ H01Q 1/24; H01Q 1/243; H01Q 1/38; H01Q 1/52; H01Q 15/24; H01Q 21/06; H01Q 21/065; H01Q 9/04; H01Q 9/0478
See application file for complete search history.

(56) References Cited

U.S. PATENT DOCUMENTS

| | | | | |
|---|---|---|---|---|
| 5,600,331 A * | 2/1997 | Buralli | .................. | H01Q 21/08 343/700 MS |
| 6,034,637 A * | 3/2000 | McCoy | .................. | H01Q 1/38 343/846 |

(Continued)

FOREIGN PATENT DOCUMENTS

| | | |
|---|---|---|
| CN | 1541431 A | 10/2004 |
| CN | 209357912 U | 9/2019 |

(Continued)

OTHER PUBLICATIONS

Srivastava, Sumit et al. Design of Tri-band Shaped Parasitic Patch Antenna. Indian Institute of Technology. Varanasi India. 4 pages.

(Continued)

*Primary Examiner* — Tho G Phan
(74) *Attorney, Agent, or Firm* — BROOKS KUSHMAN P.C.

(57) ABSTRACT

An antenna structure and an electronic device, where the antenna structure includes: a reference floor; and a radiator, where the radiator and the reference floor are stacked and spaced apart, and the radiator includes a feeding point and a first current distribution part and a second current distribution part that are respectively located at two ends of the radiator; where a cross-polarization current direction on the first current distribution part is opposite to a cross-polarization current direction on the second current distribution part under the effect of a feeding signal input on the feeding point.

20 Claims, 30 Drawing Sheets

(51) Int. Cl.

| | |
|---|---|
| ***H01Q 9/04*** | (2006.01) |
| ***H01Q 15/24*** | (2006.01) |
| ***H01Q 21/06*** | (2006.01) |

(56) References Cited

U.S. PATENT DOCUMENTS

| | | | | |
|---|---|---|---|---|
| 7,042,401 | B2 * | 5/2006 | Park | H01Q 1/38<br>343/700 MS |
| 9,231,306 | B2 * | 1/2016 | Abe | H01Q 1/38 |
| 9,368,860 | B2 * | 6/2016 | Hossain | H01Q 9/0421 |
| 10,186,771 | B2 * | 1/2019 | Bowden | H01Q 1/36 |
| 10,312,571 | B2 * | 6/2019 | Edwards | H01Q 1/521 |
| 2004/0066338 | A1 | 4/2004 | Chen et al. | |
| 2004/0130494 | A1 | 7/2004 | Fukushima et al. | |
| 2020/0083593 | A1 | 3/2020 | Choi et al. | |
| 2022/0239004 | A1 | 7/2022 | Chang et al. | |
| 2023/0022305 | A1 | 1/2023 | Zhang et al. | |
| 2023/0178894 | A1 | 6/2023 | Shen et al. | |

FOREIGN PATENT DOCUMENTS

| | | | |
|---|---|---|---|
| CN | 110474158 | A | 11/2019 |
| CN | 110890621 | A | 3/2020 |
| CN | 111613905 | A | 9/2020 |
| CN | 111934089 | A | 11/2020 |
| CN | 111987432 | A | 11/2020 |
| CN | 113013596 | A | 6/2021 |
| CN | 113193356 | A | 7/2021 |
| CN | 113193358 | A | 7/2021 |
| CN | 213753059 | U | 7/2021 |
| CN | 113644409 | A | 11/2021 |
| CN | 113708055 | A | 11/2021 |
| CN | 113839173 | A | 12/2021 |
| CN | 114142875 | A | 3/2022 |
| CN | 114552197 | A | 5/2022 |
| JP | 2007221344 | A | 8/2007 |
| WO | 2021082560 | A1 | 5/2021 |
| WO | 2021129148 | A1 | 7/2021 |
| WO | 2021244454 | A1 | 12/2021 |
| WO | 2022032577 | A1 | 2/2022 |
| WO | 2022048600 | A1 | 3/2022 |

OTHER PUBLICATIONS

Baudh, Rishabh Kumar et al. Design and analysis of C-shaped trapezoidal patch antenna for bandwidth enhancement. IEEE. 2018. 6 pages.

European Search Report for Application No. 23778361.8 mailed Jul. 17, 2025, 15 pages.

International Search Report and Written Opinion for PCT Application No. PCT/CN2023/085014, Mailed Jul. 20, 2023, 16 pages.

First Chinese Office Action for Chinese Patent Application No. 202210348898.6 mailed Feb. 23, 2024. 17 pages.

* cited by examiner

ANTENNA STRUCTURE AND ELECTRONIC DEVICE

CROSS-REFERENCE TO RELATED APPLICATIONS

This application is a continuation of International Application No. PCT/CN2023/085014 filed on Mar. 30, 2023, which claims priority to Chinese Patent Application No. 202210348898.6 filed on Apr. 1, 2022, which are incorporated herein by reference in their entireties.

TECHNICAL FIELD

This application pertains to the field of terminal technologies, and specifically, relates to an antenna structure and an electronic device.

BACKGROUND

With the development of a fifth-generation mobile communication technology (5G), users have increasingly more requirements for functions of an electronic device, and put forward a higher requirement for convenience and intelligence of the electronic device. An important requirement is to introduce a function such as indoor positioning or object searching into the electronic device. To implement this function, a positioning technology needs to be applied to a mobile phone. Due to high positioning accuracy and positioning precision, an ultra-wideband (UWB) positioning technology receives attention among many positioning technologies. A UWB technology based on a laser-direct-structuring (LDS) enters the industry due to an advantage of low costs. However, polarization purity of an existing positioning antenna is relatively low, which affects antenna performance.

SUMMARY

According to a first aspect, an embodiment of this application provides an antenna structure, including:

a reference floor; and a radiator, where the radiator and the reference floor are stacked and spaced apart, and the radiator includes a feeding point and a first current distribution part and a second current distribution part that are respectively located at two ends of the radiator; where a cross-polarization current direction on the first current distribution part is opposite to a cross-polarization current direction on the second current distribution part under the effect of a feeding signal input on the feeding point.

The radiator is a trapezoid, and the first current distribution part includes an oblique edge region of the radiator.

A slot is disposed on an upper base edge or a lower base edge of the radiator.

The radiator includes a radiation body and a branch, the radiation body is a polygon, the first current distribution part includes the branch, the branch is coupled to the radiation body, and the branch is disposed in a corner region of the radiation body.

The radiation body is a rectangle, the feeding point of the radiation body is located in the corner region of the radiation body, and the branch is disposed around a periphery of the corner region in which the feeding point is located; and/or the branch is disposed around a periphery of a corner region opposite to the corner region in which the feeding point is located.

The radiation body is a right trapezoid, and the feeding point is located in a right-angle corner region near an upper base of the radiation body or an acute-angle corner region near a lower base of the radiation body; and the branch is disposed on a periphery of at least one of the right-angle corner region and the acute-angle corner region.

A slot is disposed on an upper base edge or a lower base edge of the radiation body.

There are at least three radiators, and at least one radiator is correspondingly provided with the first current distribution part and the second current distribution part.

At least two radiators are disposed at intervals in a first region in a length direction of the first region, the at least two radiators are disposed at intervals in a second region in a length direction of the second region, the first region and the second region overlap vertically, and the radiator in the first region and the radiator in the second region are a same radiator.

According to a second aspect, an embodiment of this application provides an electronic device, including the antenna structure in the foregoing embodiment.

The electronic device further includes:

a frame;

a bracket, where the bracket is disposed on the frame, the reference floor is disposed on one side of the bracket, and the radiator is disposed on the other side of the bracket; and a mainboard, where the mainboard is disposed on a side that is of the reference floor and that is away from the mainboard.

The electronic device further includes:

a shielding cover, where the shielding cover is disposed on a side that is of the mainboard and that is close to the reference floor.

The electronic device further includes:

a display screen and a cover, where the display screen and the cover are disposed on the frame, and the bracket and the mainboard are located between the display screen and the cover.

REFERENCE SIGNS

Figure 1:
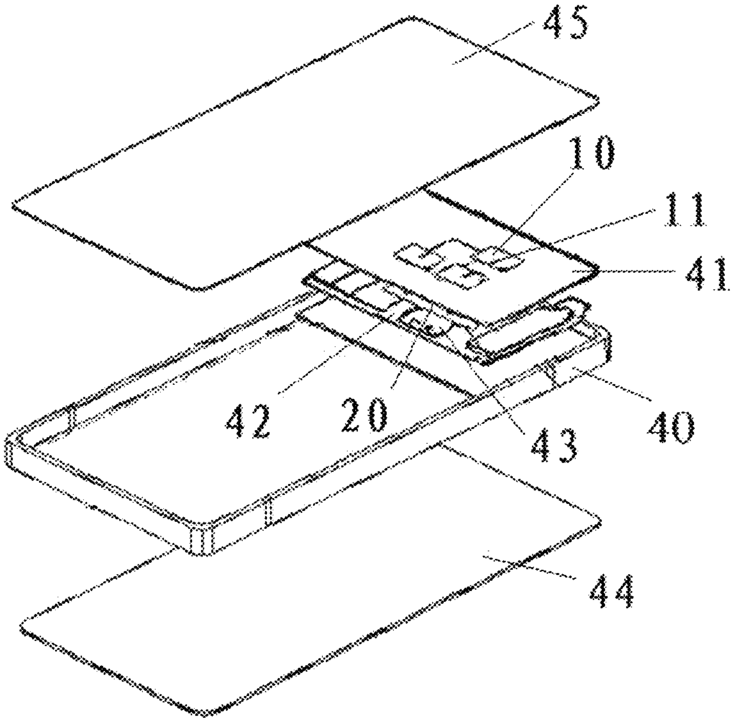
FIG. 1 is an exploded schematic diagram of an electronic device according to an embodiment of this application.
Figure 2A:
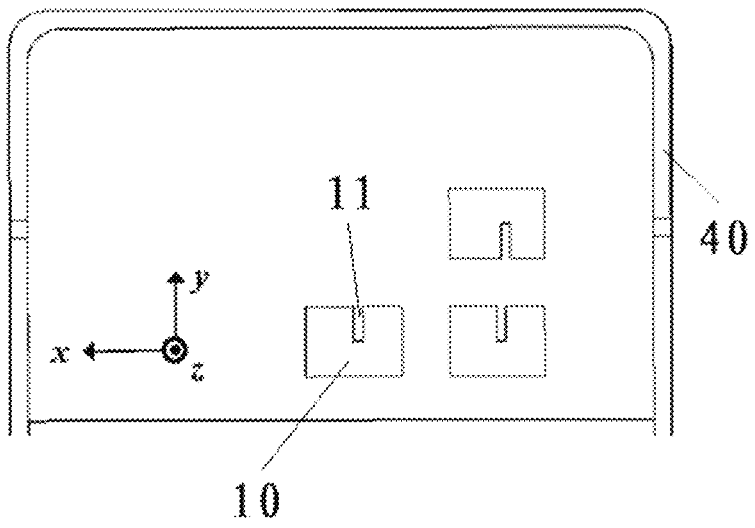
FIG. 2*a* is a schematic diagram of distribution of a radiator in an electronic device.
Figure 2B:
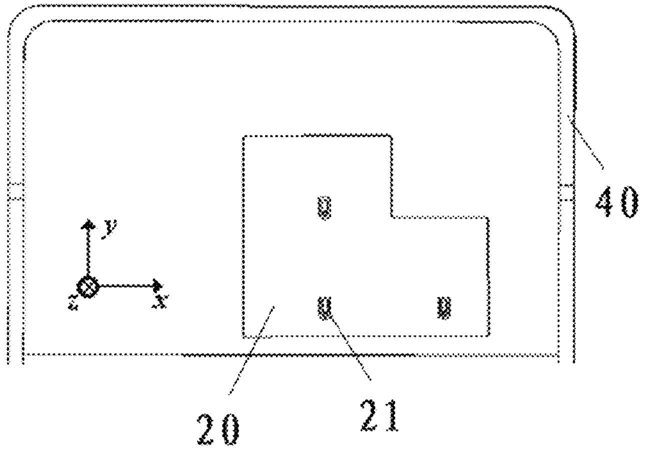
FIG. 2*b* is a schematic diagram of distribution of a reference floor in an electronic device.
Figure 2C:
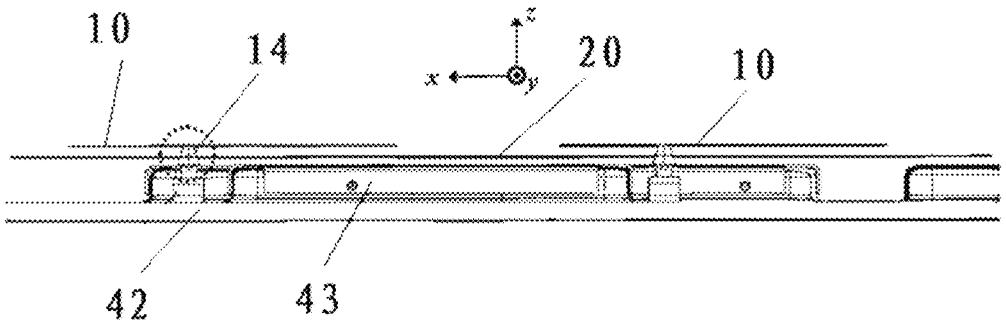
FIG. 2*c* is a schematic section view of an electronic device according to an embodiment of this application.
Figure 2D:
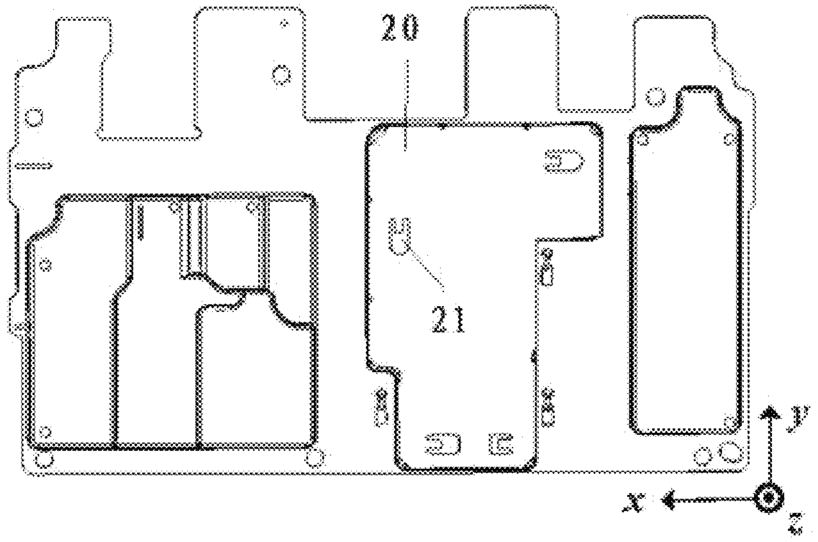
FIG. 2*d* is a schematic diagram of a structure of a through hole on a reference floor.
Figure 2E:
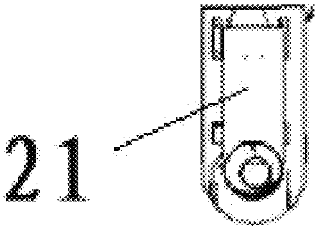
FIG. 2*e* is a schematic diagram of distribution of a through hole on a reference floor.

Radiator 10; Slot 11; Feeding point 12;

Feeding structure 13; Conductive spring 14; Radiation body 15;

Reference floor 20; Through hole 21;

First current distribution part 30; Branch 31;

Frame 40; Bracket 41; Mainboard 42;

Shielding cover 43; Display screen 44; Cover 45.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without making creative efforts shall fall within the protection scope of this application.

The terms "first", "second", and the like in the description and the claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and a character "/" generally represents an "or" relationship between associated objects.

With reference to FIG. 1 to FIG. 21*c*, an antenna structure provided in the embodiments of this application is described below in detail by using specific embodiments and application scenarios of the embodiments.

As shown in FIG. 1 to FIG. 2*e*, FIG. 10*a* to FIG. 11*d*, FIG. 13*a* to FIG. 14*d*, and FIG. 17*a* to FIG. 17*d*, the antenna structure in the embodiments of this application includes: a radiator 10 and a reference floor 20, where the radiator 10 and the reference floor 20 are stacked and spaced apart, the radiator 10 and the reference floor 20 may be stacked and spaced apart in a thickness direction of the reference floor 20, and the radiator 10 and the reference floor 20 may be parallel to each other. There may be one or more radiators 10. For example, there may be three radiators 10. An insulation medium may be disposed between the radiator 10 and the reference floor 20, and the radiator 10 is supported by using the insulation medium. The radiator 10 may be plate-shaped. In a case that there are a plurality of radiators 10, the plurality of radiators 10 may be on a same plane, and the plurality of radiators 10 may be distributed at intervals. The radiator 10 and the reference floor 20 may be conductive material members. For example, the radiator 10 and the reference floor 20 may be metal members.

The radiator 10 may include a feeding point 12 and a first current distribution part 30 and a second current distribution part 32 that are respectively located at two ends of the radiator 10. A cross-polarization current direction on the first current distribution part 30 is opposite to a cross-polarization current direction on the second current distribution part 32 under the effect of a feeding signal input on the feeding point 12. A feeding structure 13 may be electrically connected to the feeding point 12, and power may be fed to the radiator 10 through the feeding structure 13. A through hole 21 may be disposed on the reference floor 20, and a part of the feeding structure 13 may be electrically connected to the radiator 10 through the through hole 21, so that power may be fed to the radiator 10 through the feeding structure 13. The feeding structure 13 may include a conductive spring 14, and the conductive spring 14 may be electrically connected to the radiator 10 through the through hole 21.

In the antenna structure in the embodiments of this application, power may be fed to the radiator 10 through the feeding point 12, a cross-polarization current is generated in the second current distribution part 32 on the radiator 10, an anti-cross-polarization current may be distributed on the first current distribution part 30, and a current direction of the anti-cross-polarization current distributed on the first current distribution part 30 is opposite to a current direction of the cross-polarization current generated in the second current distribution part 32 on the radiator 10, so that the anti-cross-polarization current distributed on the first current distribution part 30 may mutually offset the cross-polarization current generated in the second current distribution part on the radiator 10, thereby eliminating a cross-polarization current generated on the radiator 10, improving polarization purity of the antenna structure, and improving positioning precision and antenna performance when the radiator is applied to a positioning antenna. The antenna structure has a low requirement for an external environment of an antenna. Through adjustment of the antenna structure of the antenna, impact exerted by the external environment on antenna performance can be improved. The antenna structure has a wide application range, high applicability, and low dependence on the environment.

In some embodiments, as shown in FIG. 10*b* to FIG. 11*d* and FIG. 13*a* to FIG. 14*d*, the radiator 10 may be a trapezoid, and the first current distribution part 30 may include an oblique edge region of the radiator 10. When the antenna works in a resonant mode, an oblique edge of the trapezoidal radiator 10 changes a direction of a current, and reversed cross-polarization current distribution is introduced. The current offsets a cross-polarization current generated on the radiator 10, thereby reducing cross-polarization of the antenna and improving polarization purity.

Figure 10A:
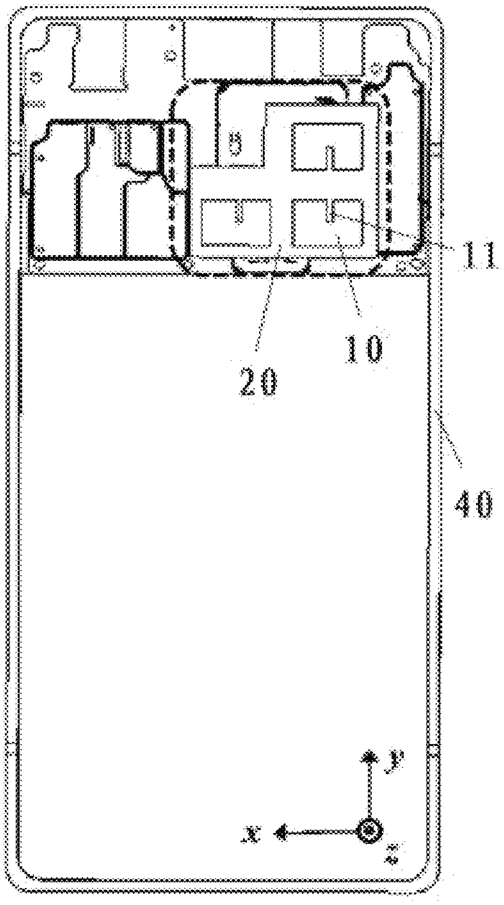
FIG. 10*a* is a schematic diagram of an antenna structure in an electronic device.
Figure 10B:
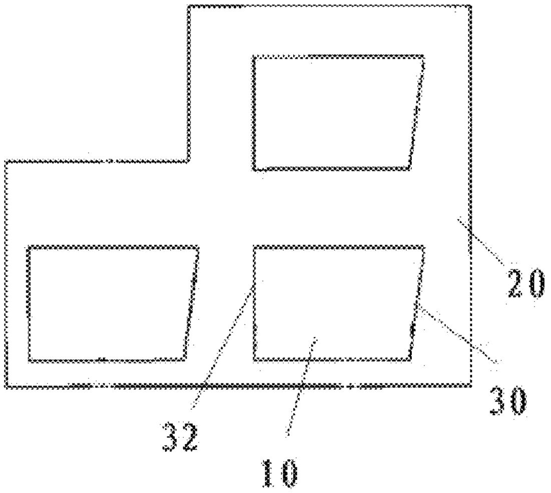
FIG. 10*b* is a top view of an antenna structure.
Figure 10C:
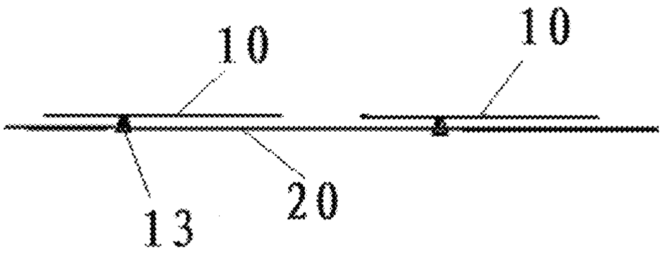
FIG. 10*c* is a side view of the antenna structure in FIG. 10*b;*
Figure 10D:
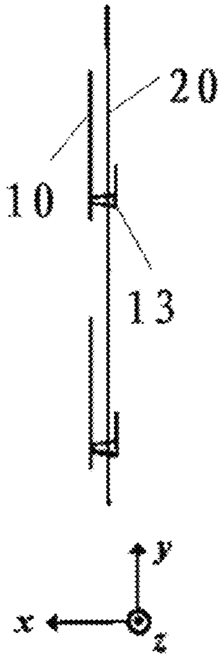
FIG. 10*d* is another side view of the antenna structure in FIG. 10*b;*
Figure 10E:
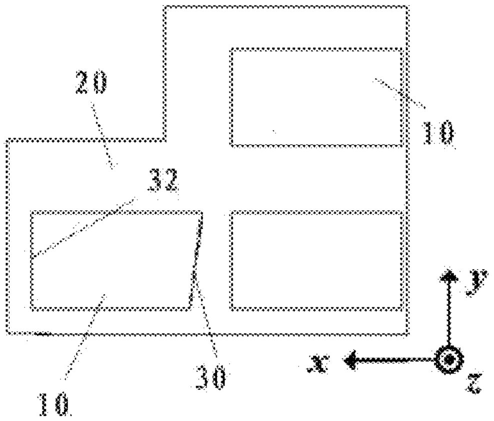
FIG. 10*e* is another top view of an antenna structure.
Figure 10F:
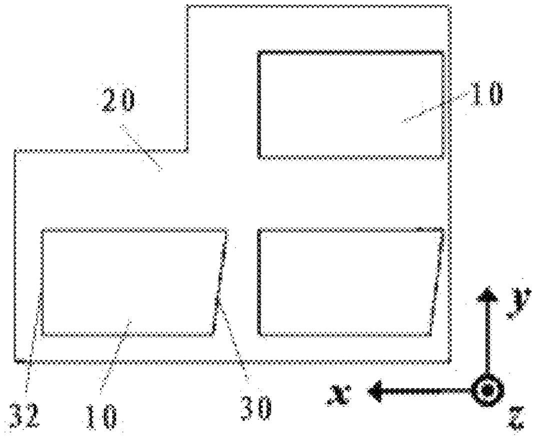
FIG. 10*f* is another top view of an antenna structure.
Figure 11A:
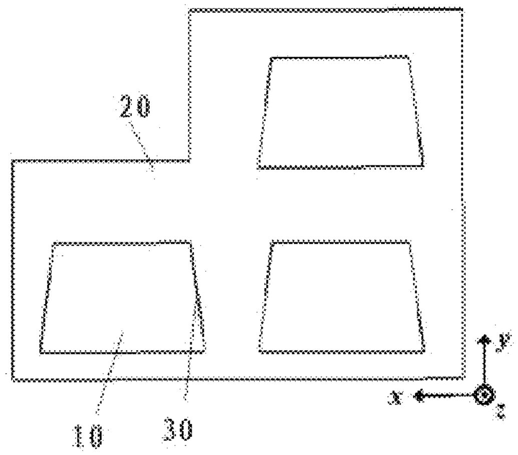
FIG. 11*a* is another top view of an antenna structure.
Figure 11B:
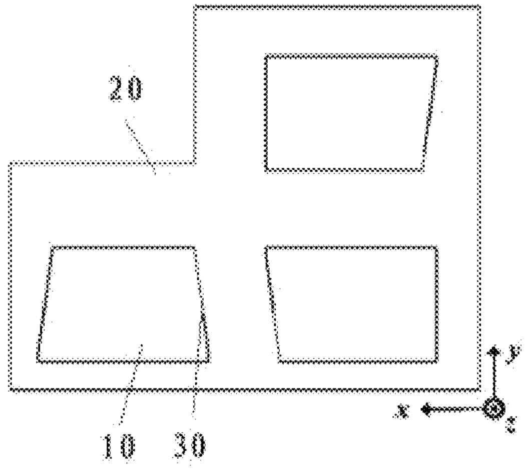
FIG. 11*b* is another top view of an antenna structure.
Figure 11C:
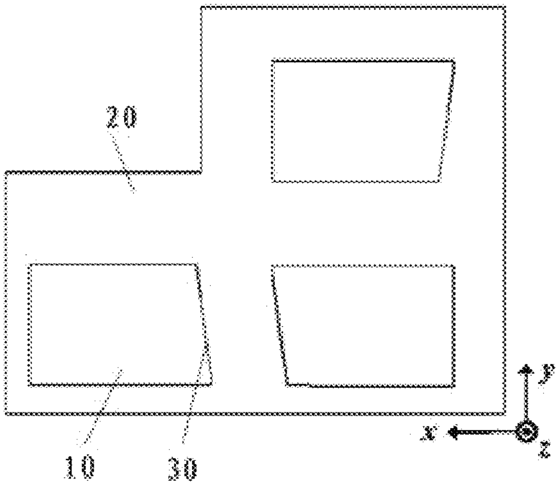
FIG. 11*c* is another top view of an antenna structure.
Figure 11D:
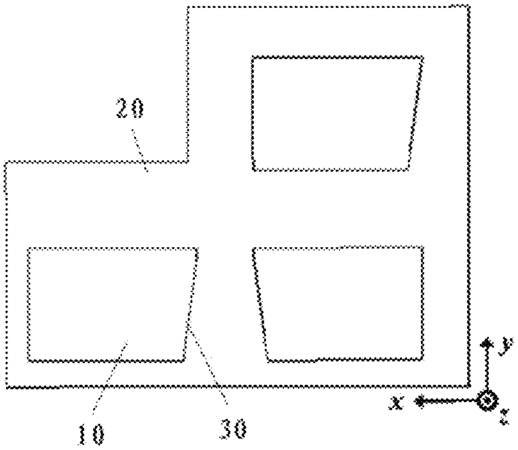
FIG. 11*d* is another top view of an antenna structure.

FIG. 10*a* shows a position of a positioning antenna in a mobile phone. For convenience of presentation, a structure such as a bracket is hidden herein. Because factors such as a device environment and mutual coupling of antennas may have similar or different effects on three antenna elements of the positioning antenna, one or several radiators 10 in the antenna structure may be designed as trapezoids, as shown in FIG. 10*b*, FIG. 10*e*, and FIG. 10*f*. The one or several radiators 10 in the antenna structure may be not limited to a right trapezoid structure, or may be a general trapezoid structure, as shown in FIG. 11*a*. Alternatively, a right trapezoid structure or a general trapezoid structure is used on different antennas, as shown in FIG. 11*b*. In addition, an orientation of the right trapezoid structure in the antenna structure may change according to different actual device environments, which may be shown in FIG. 11*c* and FIG. 11*d*.

Figure 12A:
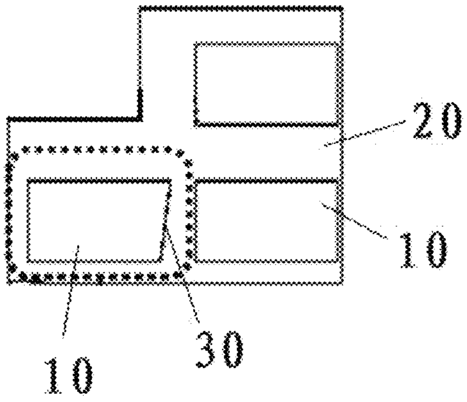
FIG. 12*a* is a schematic diagram in which a radiator in an antenna structure is disposed as a trapezoid.
Figure 12B:
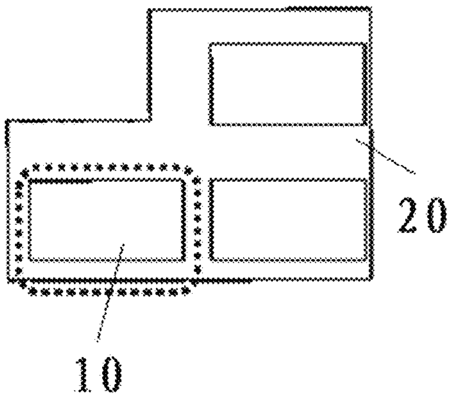
FIG. 12*b* is a schematic diagram in which a radiator in an antenna structure is not disposed as a trapezoid.
Figure 12C:
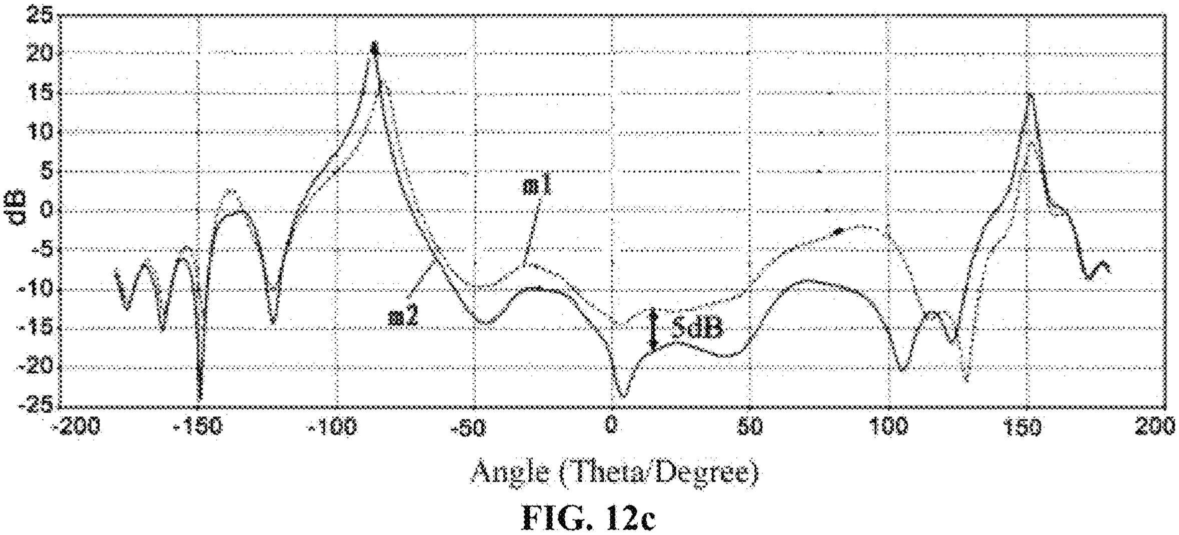
FIG. 12*c* is a schematic diagram of a polarization status of an antenna.

One radiator 10 in the antenna structure shown in FIG. 12*a* is a trapezoid. Three radiators 10 in the antenna structure shown in FIG. 12*b* are rectangles, and one radiator 10 and the reference floor 20 form one antenna element. As shown in FIG. 12*c*, m1 indicates a polarization status of the antenna element in the antenna structure shown in FIG. 12*b*, and m2 indicates a polarization status of an antenna element with a trapezoidal radiator 10 in the antenna structure shown in FIG. 12*a*. The trapezoidal radiator 10 can implement high polarization purity of the antenna element. As shown in FIG. 12*c*, the antenna element with the trapezoidal radiator 10 significantly improves polarization purity in ±60° compared with an antenna element with a rectangular radiator 10.

In some other embodiments, as shown in FIG. 13*a* and FIG. 13*d* to FIG. 14*d*, a slot 11 may be disposed on an upper base edge or a lower base edge of the radiator 10. The slot 11 may be disposed on upper base edges or lower base edges of one or more radiators 10. For example, there are three radiators 10, and the slot 11 may be disposed on an upper base edge or a lower base edge of each of the three radiators 10. Through the slot 11, phases of currents distributed on two opposite side edges of the radiator 10 may be different, and a specific phase difference exists, so that a radiation pattern of the antenna may deviate, and therefore the antenna has high directional radiation pattern performance. Disposing the slot helps implement antenna miniaturization.

Figure 13A:
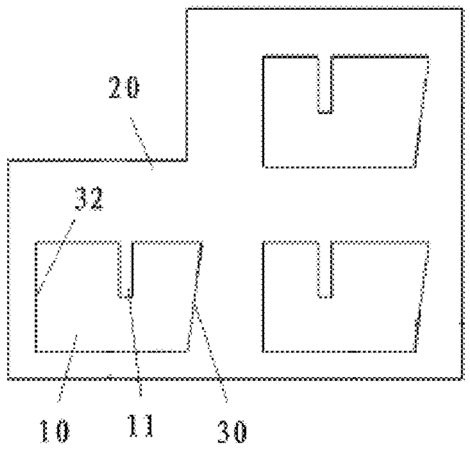
FIG. 13*a* is a top view of an antenna structure.
Figure 13B:
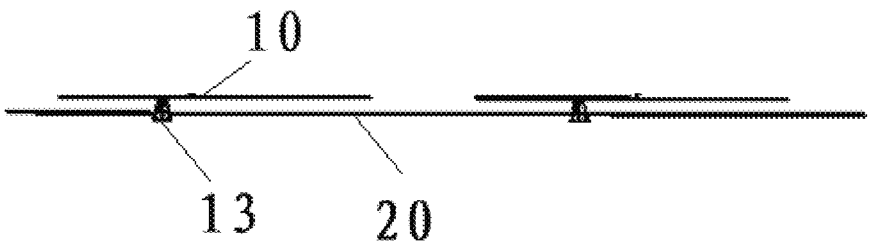
FIG. 13*b* is a side view of the antenna structure in FIG. 13*a;*
Figure 13C:
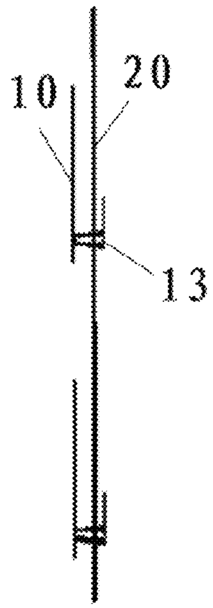
FIG. 13*c* is another side view of the antenna structure in FIG. 13*a;*
Figure 13D:
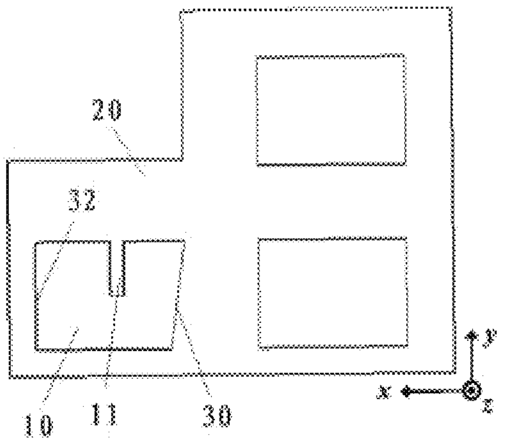
FIG. 13*d* is yet another top view of an antenna structure.
Figure 13E:
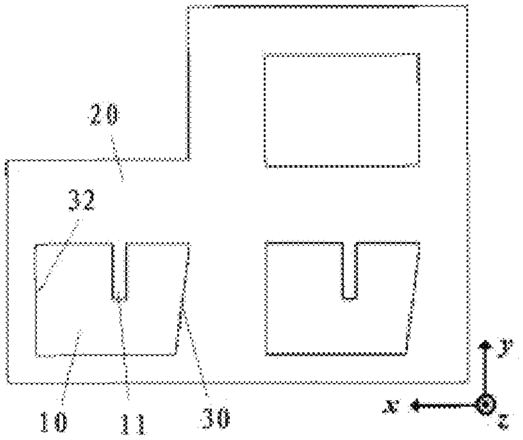
FIG. 13*e* is yet another top view of an antenna structure.
Figure 14A:
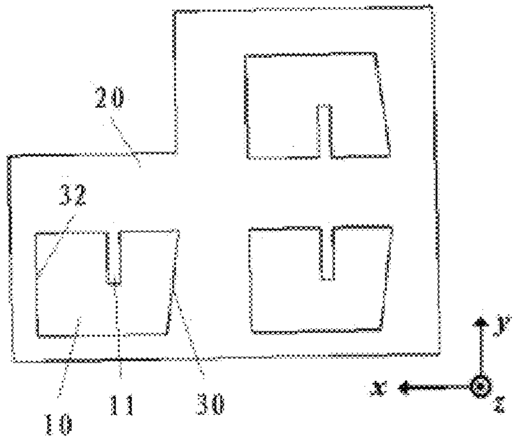
FIG. 14*a* is yet another top view of an antenna structure.
Figure 14B:
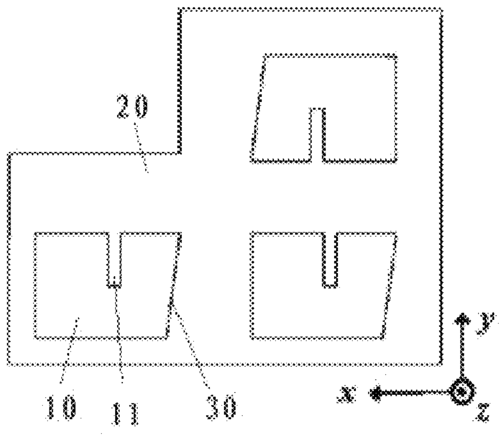
FIG. 14*b* is yet another top view of an antenna structure.
Figure 14C:
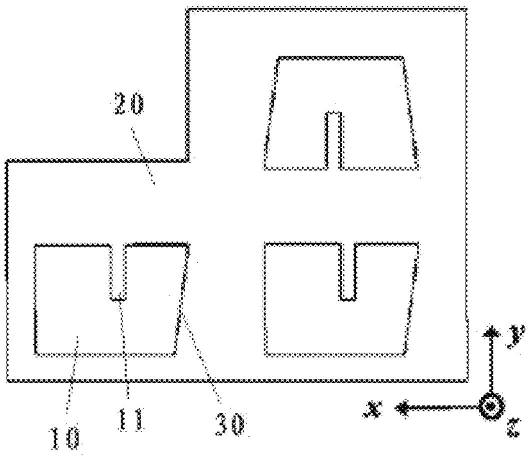
FIG. 14*c* is yet another top view of an antenna structure.
Figure 14D:
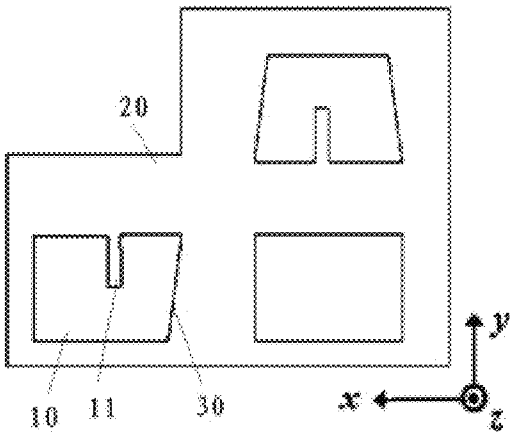
FIG. 14*d* is yet another top view of an antenna structure.

As shown in FIG. 13*a* to FIG. 13*e*, one or more radiators 10 in the antenna structure are designed as a trapezoidal structure in which a slot 11 is disposed on one side edge, which may be specifically shown in FIG. 13*a*, FIG. 13*d*, and FIG. 13*e*. One radiator 10 and the reference floor 20 form one antenna element. A combination of the antenna element may not be limited to structures shown in FIG. 13*a*, FIG. 13*d*, and FIG. 13*e*. Different combinations may be implemented according to different device environments. For example, as shown in FIG. 14*a* to FIG. 14*d*, a plurality of radiators 10 in the antenna structure may be designed as a trapezoidal structure in which a slot 11 is disposed on one side edge. A position and a shape of the slot 11 may be selected according to an actual situation, and a relative position relationship between different radiators 10 may be selected according to an actual situation.

Figure 15A:
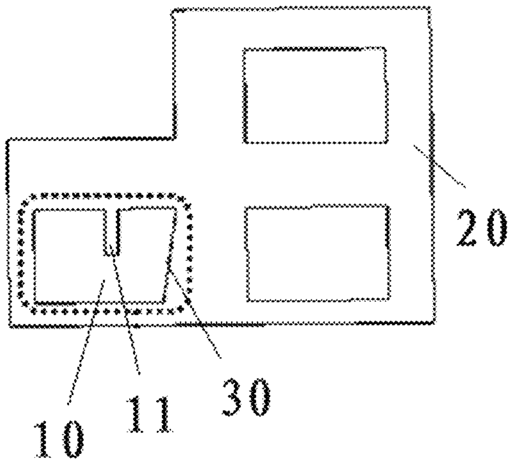
FIG. 15*a* is a schematic diagram in which a radiator in an antenna structure is disposed as a trapezoid with a slot.
Figure 15B:
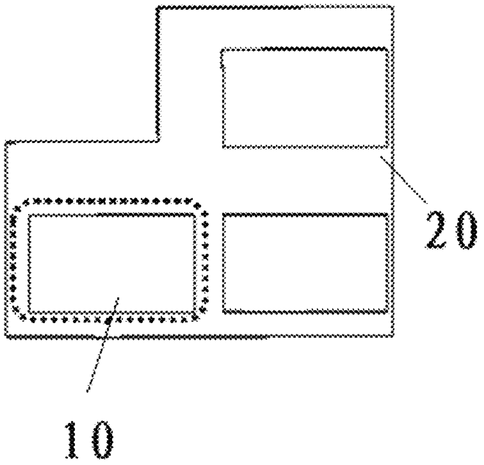
FIG. 15*b* is a schematic diagram in which a radiator in an antenna structure is not disposed as a trapezoid.
Figure 15C:
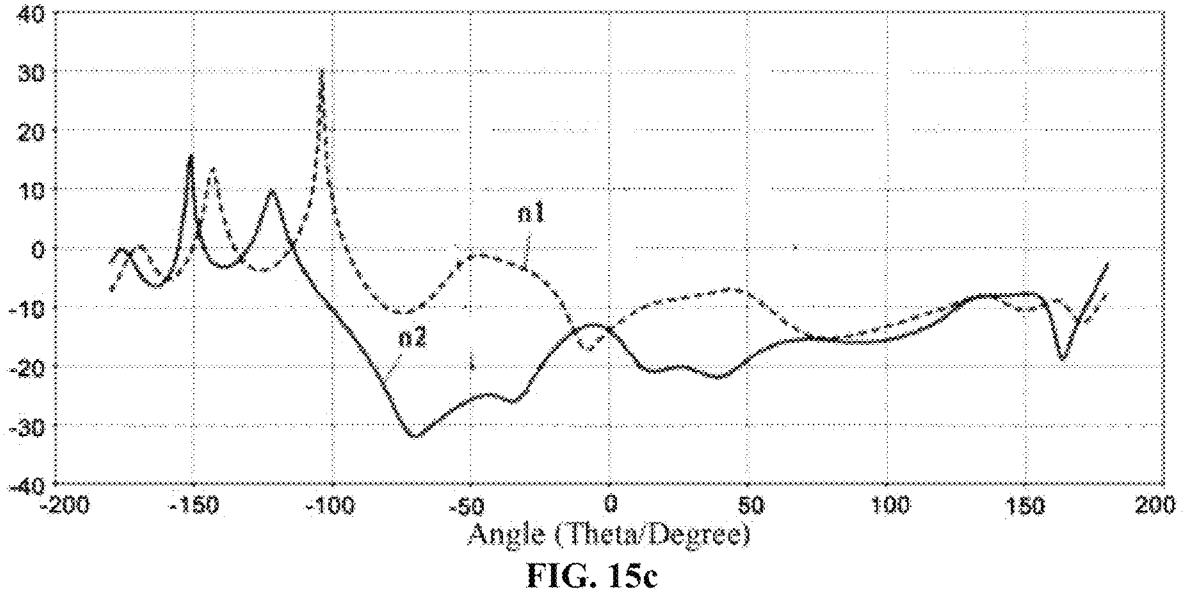
FIG. 15*c* is a schematic diagram of comparison of polarization purity of antennas.

One radiator 10 in an antenna structure shown in FIG. 15*a* is a trapezoid, and a slot 11 is disposed on one side edge of the trapezoidal radiator 10. Three radiators 10 in an antenna structure shown in FIG. 15*b* are rectangles, and one radiator 10 and the reference floor 20 form one antenna element. As shown in FIG. 15*c*, n1 indicates a polarization status of the antenna element in the antenna structure shown in FIG. 15*b*, *n*2 indicates a polarization status of an antenna element with the trapezoidal radiator 10 in the antenna structure shown in FIG. 15*a*, and the trapezoidal radiator 10 can implement high polarization purity of the antenna element. As shown in FIG. 15*c*, polarization purity of the antenna element with the trapezoidal radiator 10 is significantly improved in #60° compared with an antenna element with a rectangular radiator 10.

Figure 16:
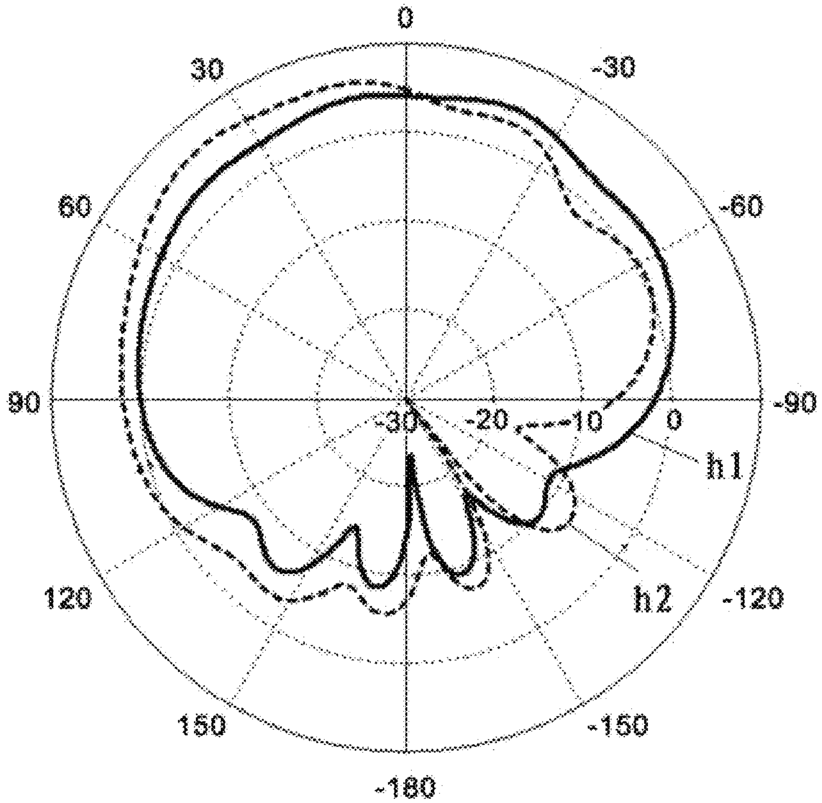
FIG. 16 is a schematic diagram of comparison of radiation patterns of antennas.

As shown in FIG. 16, h2 represents a radiation pattern of the antenna element in the antenna structure shown in FIG. 15*b*, and h1 represents the radiation pattern of an antenna element with the trapezoidal radiator 10 in the antenna structure shown in FIG. 15*a*. Deviation of a radiation pattern of the antenna element with the trapezoidal radiator 10 is significantly improved when compared with the antenna element with the rectangular radiator 10.

In this embodiment of this application, as shown in FIG. 17*a* to FIG. 17*d* and FIG. 19*a* to FIG. 20*f*, the radiator 10 may include a radiation body 15 and a branch 31, the radiation body 15 may be a polygon, the radiation body 15 may be a trapezoid or a parallelogram, the first current distribution part 30 may include the branch 31, the branch 31 may be coupled to the radiation body 15, the branch 31 may be coupled to the radiation body 15 at intervals, and the branch 31 is disposed in a corner region of the radiation body 15. The branch 31 may be a conductive material member. For example, the branch 31 may be a metal member. The branch 31 may be coupled to at least one radiation body 15 at intervals, and the branch 31 may be disposed on a periphery of a corner region of a radiation body 15 in at least one radiator 10. The branch 31 may be disposed around a periphery of a corner region of a corresponding radiation body 15. The branch 31 may be L-shaped or U-shaped, and a specific shape may be selected according to an actual situation. The radiation body 15 in the at least one radiator 10 may be coupled to the branch 31 at intervals, and each radiation body 15 may be coupled to a corresponding branch 31 at intervals. Currents may be distributed on the branch 31 through coupling between the branch 31 and the radiation body 15, and a cross-polarization current generated on the radiation body 15 can be offset by using the current distributed on the branch 31, thereby implementing high polarization purity of an antenna.

In some embodiments, the radiation body 15 is a rectangle, the feeding point 12 of the radiation body 15 may be located in a corner region of the radiation body 15, the feeding structure 13 is electrically connected to the feeding point 12, and the branch 31 may be disposed around a periphery of the corner region in which the feeding point 12 is located. The branch 31 may be disposed around a periphery of a corner region opposite to the corner region in which the feeding point 12 is located. There may be one or more radiators 10. A radiation body 15 in at least one radiator 10 may be a rectangle. A feeding point 12 of the radiation body 15 in the at least one radiator 10 is located in a corner region of the radiation body 15. For example, a feeding point 12 of a rectangular radiation body 15 may be located in a corner region of the rectangular radiation body 15. The branch 31 may be disposed around a periphery of the corner region in which the feeding point 12 is located, or the branch 31 may be disposed around a periphery of a corner region opposite to the corner region in which the feeding point 12 is located. A radiation body 15 in one radiator 10 may be correspondingly provided with two branches 31. One branch 31 may be disposed around a periphery of a corner region of a rectangular radiation body 15 in which the feeding point 12 is located, and the other branch 31 may be disposed around a periphery of a corner region opposite to the corner region in which the feeding point 12 is located. A cross-polarization current generated on the radiation body 15 can be offset by using the current distributed on the branch 31, thereby implementing high polarization purity of the antenna. The radiation body 15 may be a rectangle or a trapezoid, a position relationship between different radiation bodies 15 may be selected according to an actual situation, and a combination relationship between radiation bodies 15 of different shapes may be selected according to an actual situation.

Figure 17A:
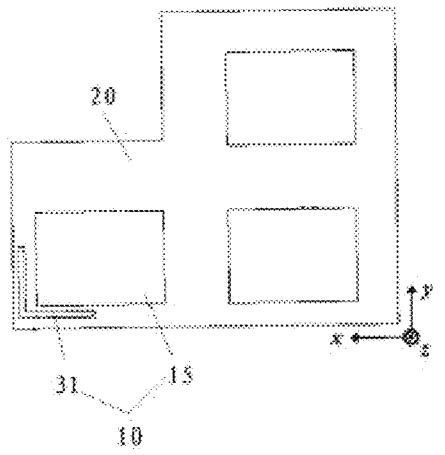
FIG. 17*a* is yet another top view of an antenna structure.
Figure 17B:
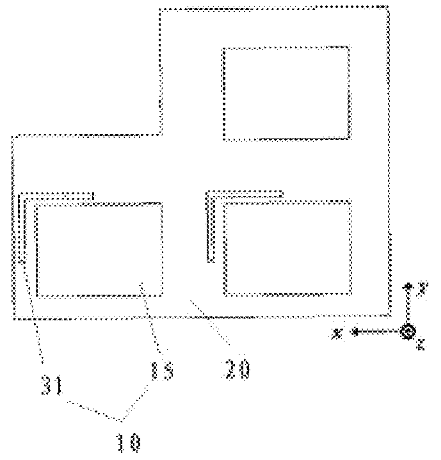
FIG. 17*b* is yet another top view of an antenna structure.
Figure 17C:
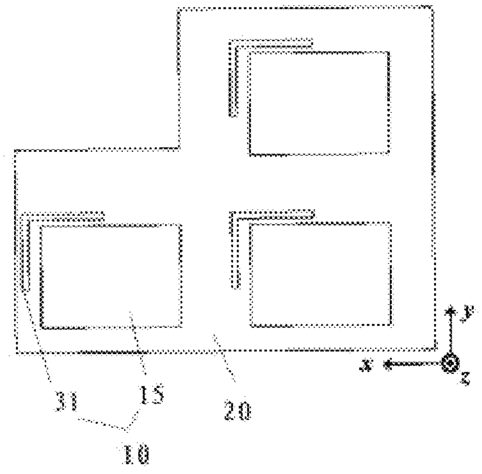
FIG. 17*c* is yet another top view of an antenna structure.
Figure 17D:
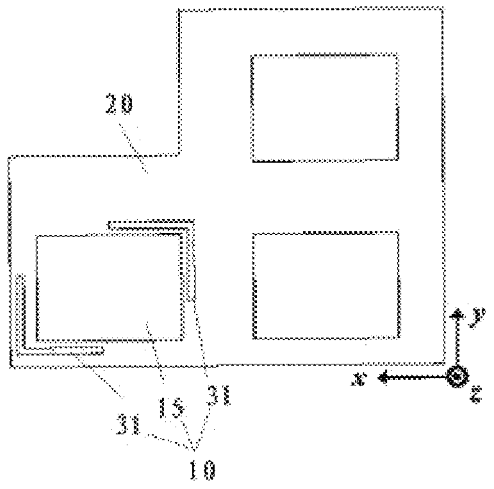
FIG. 17*d* is yet another top view of an antenna structure.

As shown in FIG. 17*a* to FIG. 17*d*, there may be a plurality of radiators 10, for example, three. The branch 31 is disposed on a periphery of a corner region of a radiation body 15 in at least one radiator 10 in the three radiators 10. FIG. 17*a* shows that an L-shaped branch 31 is disposed in a corner region of a radiation body 15 in one radiator 10. The introduced branch 31 can improve polarization purity of an antenna element. According to a device environment, the branch 31 may be alternatively disposed on peripheries of corner regions of radiation bodies 15 in the plurality of radiators 10, as shown in FIG. 17*b* and FIG. 17*c*. In addition, alternatively, two branches 31 may be disposed on a periphery of a corner region of a radiation body 15 in one radiator 10. For example, one branch 31 is disposed on a periphery of each of two opposite corner regions of a radiation body 15 in one radiator 10, as shown in FIG. 17*d*.

Figure 18A:
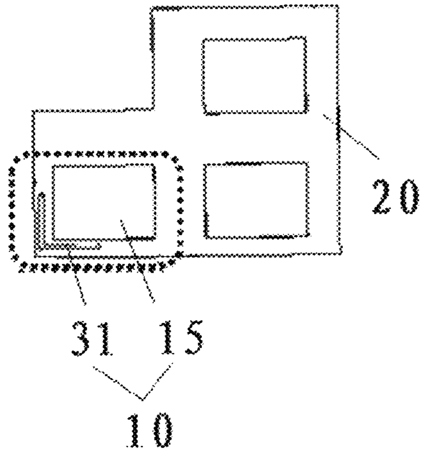
FIG. 18*a* is a schematic diagram in which a branch is disposed on a periphery of a corner region of a radiation body.
Figure 18B:
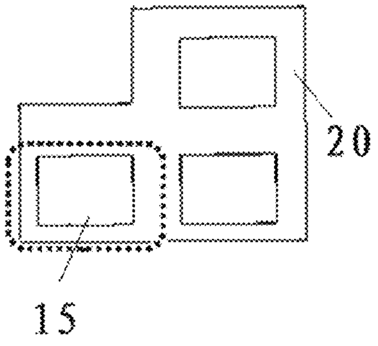
FIG. 18*b* is a schematic diagram in which no branch is disposed on a periphery of a corner region of a radiation body.
Figure 18C:
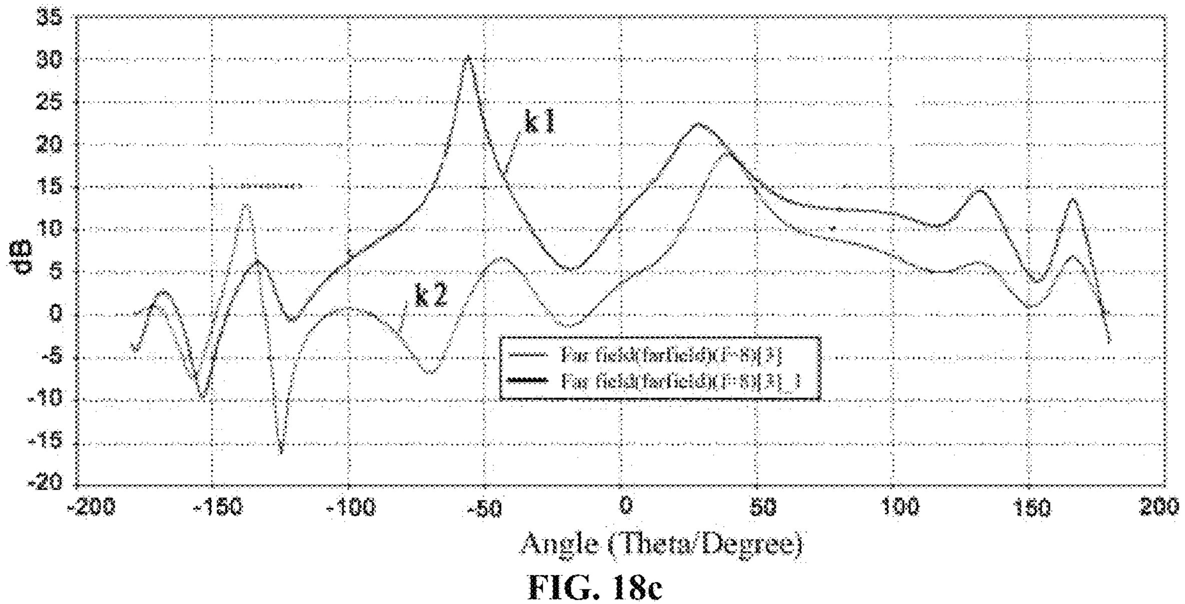
FIG. 18*c* is a schematic diagram of comparison of polarization purity of antennas.

The branch 31 is disposed on the periphery of the corner region of the radiation body 15 in the radiator 10, so that polarization purity of the antenna element can be improved. As shown in FIG. 18*a*, in an antenna structure, a branch 31 is disposed on a periphery of a corner region of a radiation body 15 in one radiator 10. As shown in FIG. 18*b*, no branch 31 is disposed on a periphery of a corner region of a radiation body 15 in an antenna structure. One radiator 10 and the reference floor 20 form one antenna element. As shown in FIG. 18*c*, k1 indicates a polarization status of an antenna element on which the branch 31 is disposed in the antenna structure shown in FIG. 18*a*, and k2 indicates a polarization status of an antenna element on which no branch 31 is disposed in the antenna structure shown in FIG. 18*b*. The antenna element on which the branch 31 is disposed can implement high polarization purity, and polarization purity in ±60° is significantly improved.

In some other embodiments, the radiation body 15 may be a right trapezoid. The feeding structure 13 is electrically connected to the feeding point 12 of the radiation body 15, and the feeding point 12 is located in a right-angle corner region near an upper base of the radiation body 15 or an acute-angle region near a lower base of the radiation body 15. The branch 31 is disposed on a periphery of at least one of the right-angle corner region and the acute-angle corner region. An oblique edge of the radiation body 15 in a right trapezoid shape changes a direction of a current, and reversed cross-polarization current distribution is introduced. The current offsets a cross-polarization current, thereby reducing cross-polarization of the antenna and improving polarization purity. A cross-polarization current generated on the radiation body 15 can be offset by using the current distributed on the branch 31, thereby implementing high polarization purity of the antenna.

There may be one or more radiators 10. A radiation body 15 in at least one radiator 10 may be a right trapezoid. The feeding structure 13 may be electrically connected to a feeding point 12 of the radiation body 15. The feeding point 12 of the radiation body 15 in the at least one radiator 10 is located in a right-angle corner region near an upper base of the radiation body 15 or an acute-angle corner region near a lower base of the radiation body 15. The branch 31 may be disposed on a periphery of at least one of the right-angle corner region and the acute-angle corner region. For example, the radiation body 15 in the at least one radiator 10 is a right trapezoid, and a feeding point 12 of at least one radiation body 15 in a right trapezoid shape is located in a right-angle corner region near an upper base of the radiation body 15 or an acute-angle corner region near a lower base of the radiation body 15. The branch 31 may be disposed on a periphery of at least one of the right-angle corner region and the acute-angle corner region. A cross-polarization current generated on the radiation body 15 can be offset by using the current distributed on the branch 31, thereby implementing high polarization purity of the antenna. An oblique edge of the radiation body 15 in a right trapezoid shape may change a direction of a current, and reversed cross-polarization current distribution is introduced. The current offsets a cross-polarization current, thereby reducing cross-polarization of the antenna and improving polarization purity.

Figure 19A:
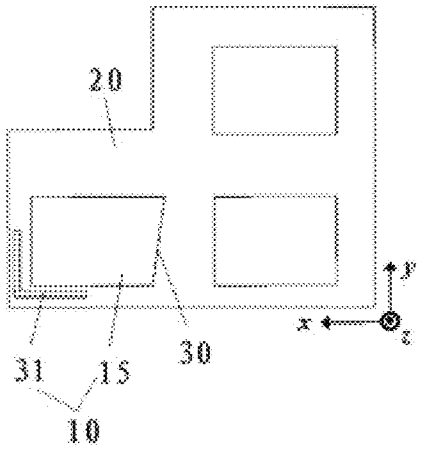
FIG. 19*a* is yet another top view of an antenna structure.
Figure 19B:
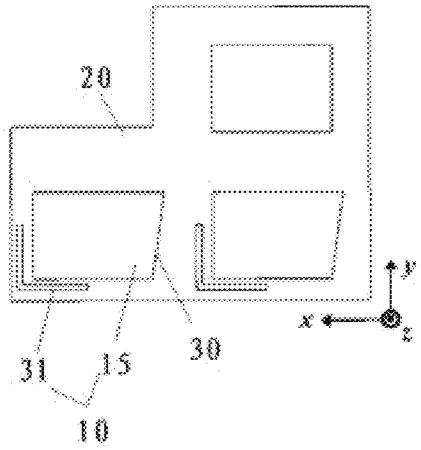
FIG. 19*b* is yet another top view of an antenna structure.
Figure 19C:
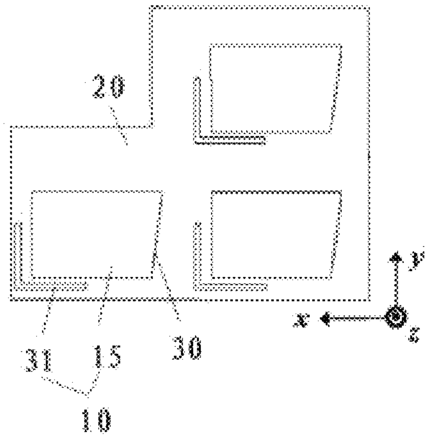
FIG. 19*c* is yet another top view of an antenna structure.
Figure 20A:
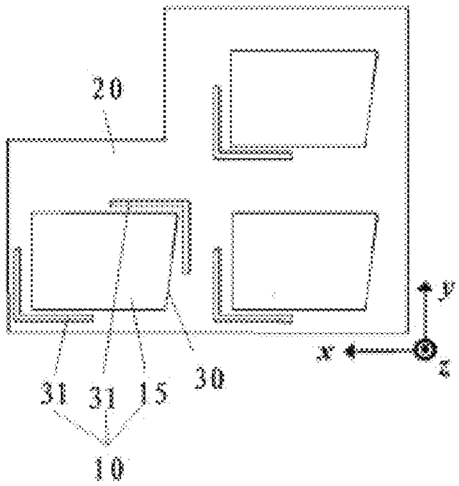
FIG. 20*a* is yet another top view of an antenna structure.
Figure 20B:
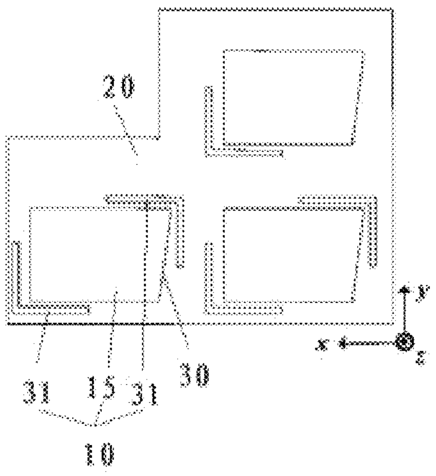
FIG. 20*b* is yet another top view of an antenna structure.
Figure 20C:
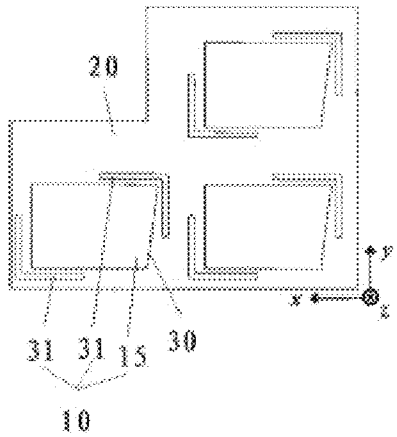
FIG. 20*c* is yet another top view of an antenna structure.
Figure 20D:
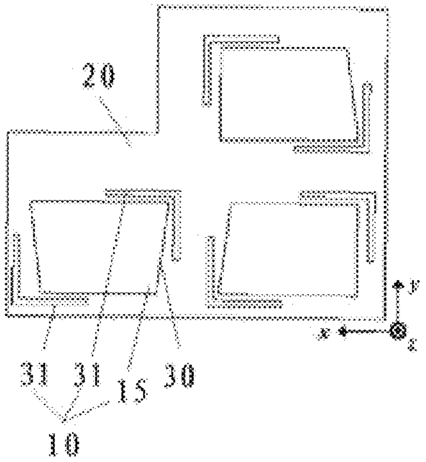
FIG. 20*d* is another top view of an antenna structure.
Figure 20E:
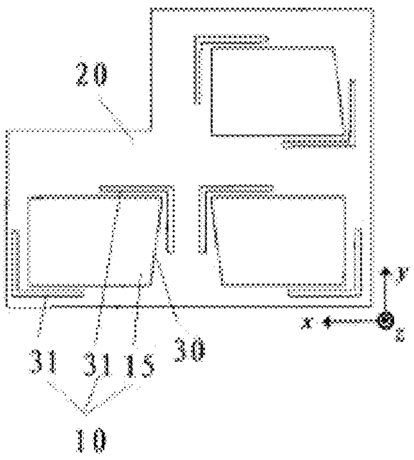
FIG. 20*e* is yet another top view of an antenna structure.
Figure 20F:
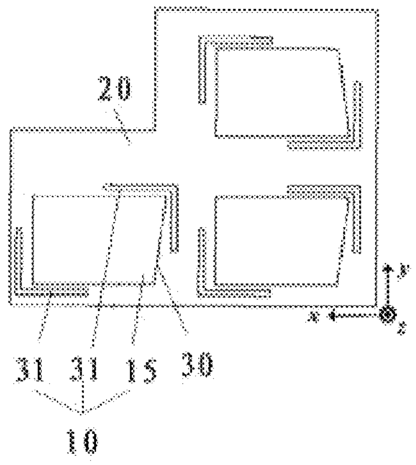
FIG. 20*f* is yet another top view of an antenna structure.

As shown in FIG. 19*a* to FIG. 19*c*, a combination of a trapezoidal structure and an L-shaped branch is used in one or more antenna elements in an antenna structure. According to different environments of a terminal device, a plurality of L-shaped branches 31 may be alternatively introduced around each antenna element. Two branches 31 may be disposed on a periphery of a corner region of a radiation body 15 in one antenna element, and one branch 31 is correspondingly disposed on a periphery of one corner region, as shown in FIG. 20*a*. Two branches 31 may be alternatively used on a plurality of antenna elements, as shown in FIG. 20*b* and FIG. 20*c*, to achieve a better effect. To ensure that effects generated by an L-shaped branch 31 and a structure of a trapezoid are superposed, the L-shaped branch 31 may be disposed at a position at which an acute angle of the trapezoid protrudes, at a diagonal position of the acute angle, or both at a position of the acute angle of the trapezoid and the diagonal position of the acute angle. In addition, a contour of the radiation body 15 in the antenna structure is not limited to a right trapezoid, or may be a general trapezoid, as shown in FIG. 20*d*. Trapezoidal radiation bodies 15 in three antenna elements may also have different orientations. As shown in FIG. 20*e* and FIG. 20*f*, a specific setting manner may be selected according to an actual situation.

Figure 21A:
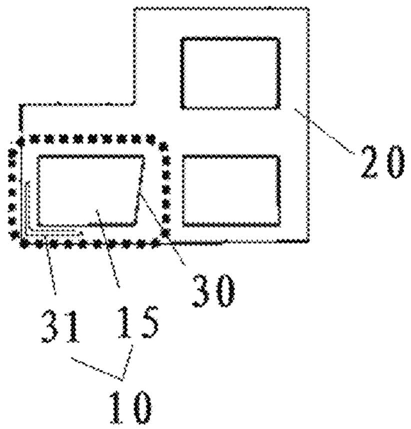
FIG. 21*a* is a schematic diagram in which a branch is disposed on a periphery of a corner region of a radiation body.
Figure 21B:
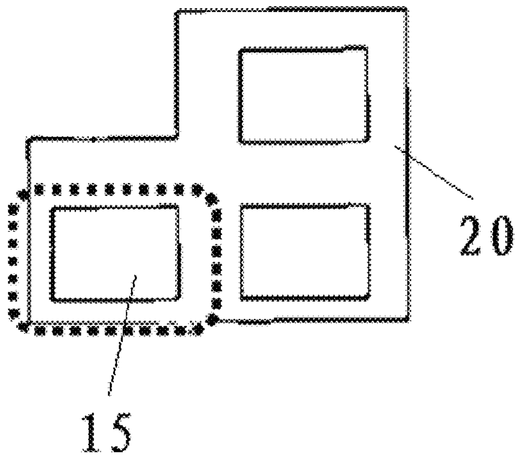
FIG. 21*b* is a schematic diagram in which no branch is disposed on a periphery of a corner region of a radiation body.
Figure 21C:
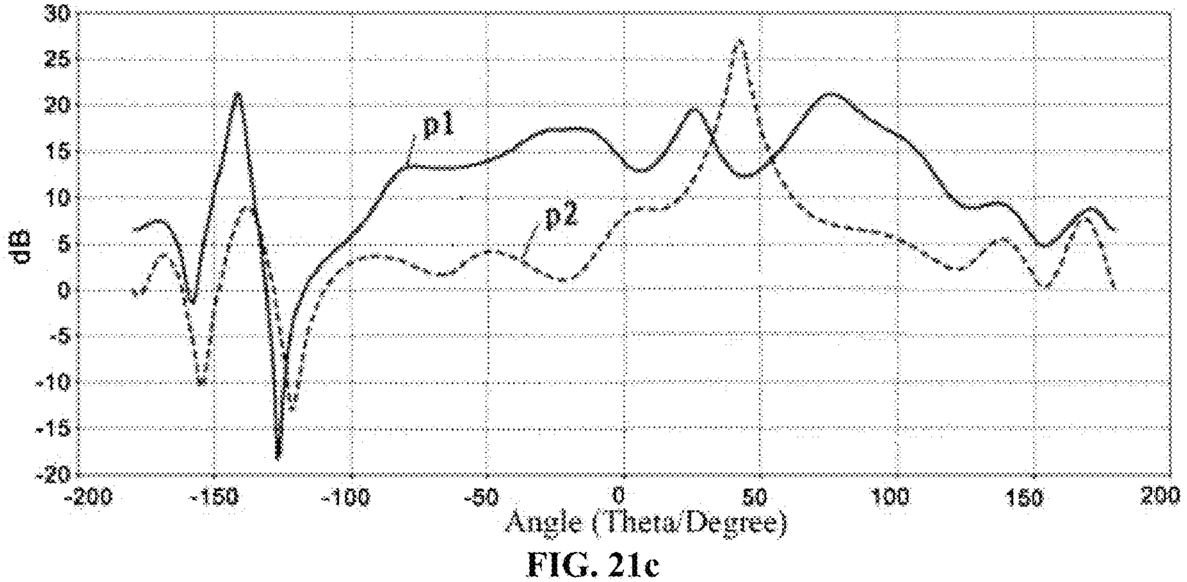
FIG. 21*c* is a schematic diagram of comparison of polarization purity of antennas.

As shown in FIG. 21*a*, in an antenna structure, a branch 31 is disposed on a periphery of a corner region of a radiation body 15 in one radiator 10. As shown in FIG. 21*b*, no branch 31 is disposed on a periphery of a corner region of a radiation body 15 in an antenna structure. One radiator 10 and the reference floor 20 form one antenna element. As shown in FIG. 21*c*, p1 indicates a polarization status of an antenna element on which the branch 31 is disposed in the antenna structure shown in FIG. 21*a*, and p2 indicates a polarization status of an antenna element on which no branch 31 is disposed in the antenna structure shown in FIG. 21*b*. The antenna element on which the branch 31 is disposed can implement high polarization purity, and polarization purity in ±60° is significantly improved.

Optionally, a slot 11 is disposed on an upper base edge or a lower base edge of the radiation body 15. For example, there are three radiators 10. The slot 11 may be disposed on an upper base edge or a lower base edge of a radiation body 15 in the at least one radiator 10. For example, the slot 11 may be disposed on an upper base edge or a lower base edge of a radiation body 15 in each of the three radiators 10. Through the slot 11, phases of currents distributed on two opposite side edges of the radiation body 15 may be different, and a specific phase difference exists, so that a radiation pattern of the antenna may deviate, and therefore the antenna has high directional radiation pattern performance.

In this embodiment of this application, there are at least three radiators 10, and at least one radiator 10 is correspondingly provided with the first current distribution part 30 and the second current distribution part 32. There may be three radiators 10, and each radiator 10 may be correspondingly provided with the first current distribution part 30 and the second current distribution part 32. A plurality of radiators 10 may be disposed as positioning antennas for accurate positioning, to improve positioning precision.

Optionally, at least two radiators 10 are disposed at intervals in a first region in a length direction of the first region, at least two radiators 10 are disposed at intervals in a second region in a length direction of the second region, the first region and the second region overlap vertically, and the radiator 10 in the first region and the radiator 10 in the second region are a same radiator 10; in other words, there is only one radiator 10 in an overlapping region of the first region and the second region, and the radiators 10 in the first region and the second region are a same radiator 10 in the overlapping region, so that the radiators 10 may be distributed in an L shape. For example, there may be three radiators 10. Two radiators 10 are disposed at intervals in the first region in the length direction of the first region, two radiators 10 are disposed at intervals in the second region in the length direction of the second region, and the radiators 10 in the first region and the second region are a same radiator 10 in the overlapping region. In a case that the foregoing three radiators 10 are disposed in an antenna structure, the antenna structure may be used as a UWB antenna. Accurate positioning can be performed by using the three radiators 10, thereby improving positioning precision.

Figure 3A:
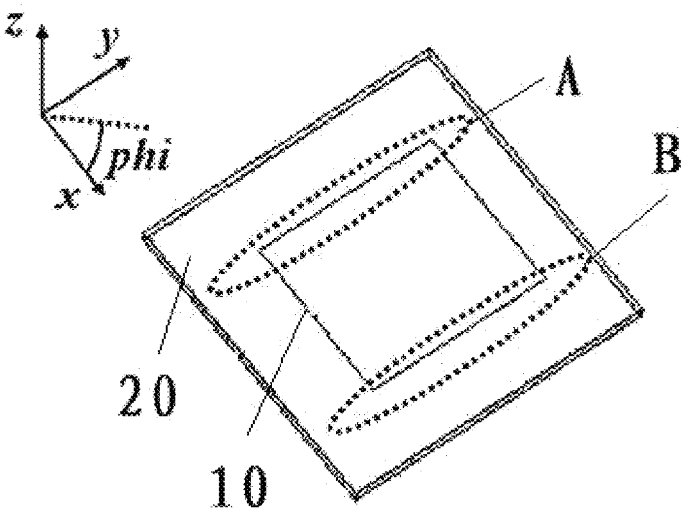
FIG. 3*a* is a schematic diagram of an antenna without a slot on a radiator.
Figure 3B:
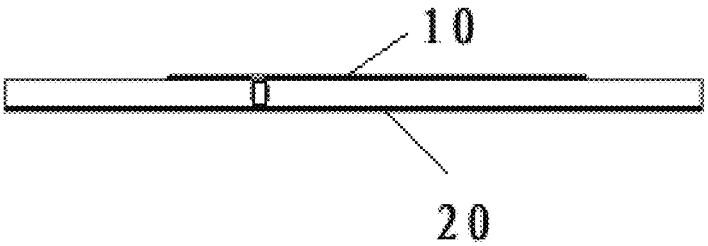
FIG. 3*b* is a side view of an antenna structure in FIG. 3*a;*
Figure 3C:
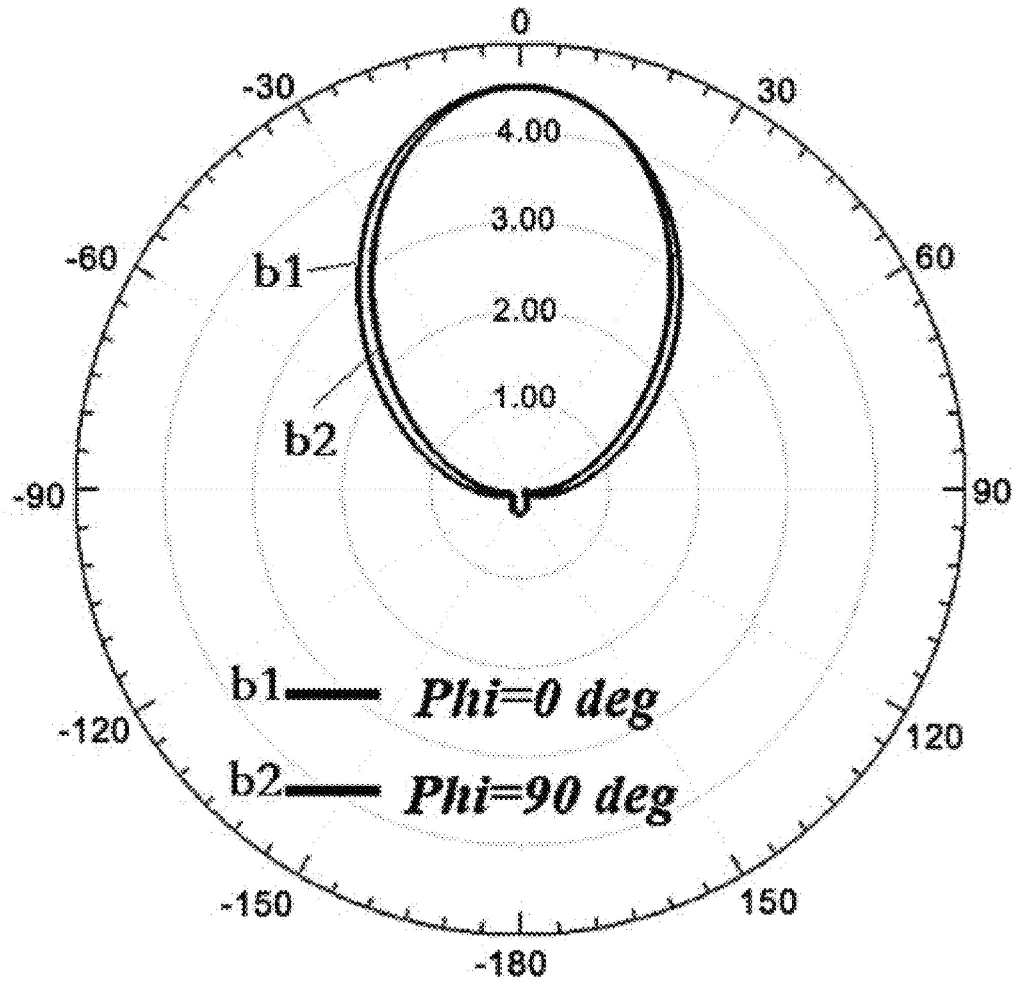
FIG. 3*c* is a schematic diagram of performance of a radiation pattern of the antenna in FIG. 3*a;*
Figure 4A:
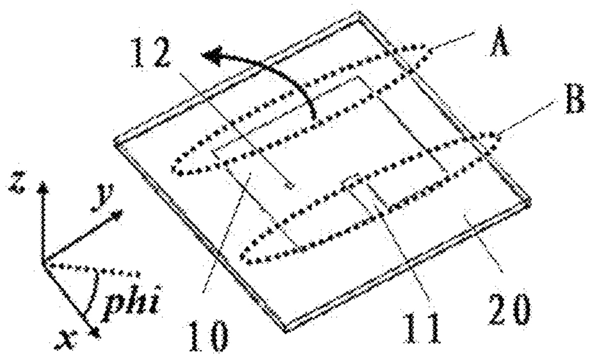
FIG. 4*a* is a schematic diagram of an antenna with a slot on a radiator.
Figure 4B:
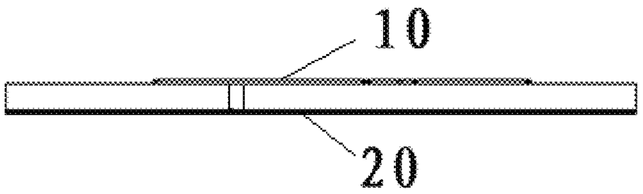
FIG. 4*b* is a side view of an antenna structure in FIG. 4*a;*
Figure 4C:
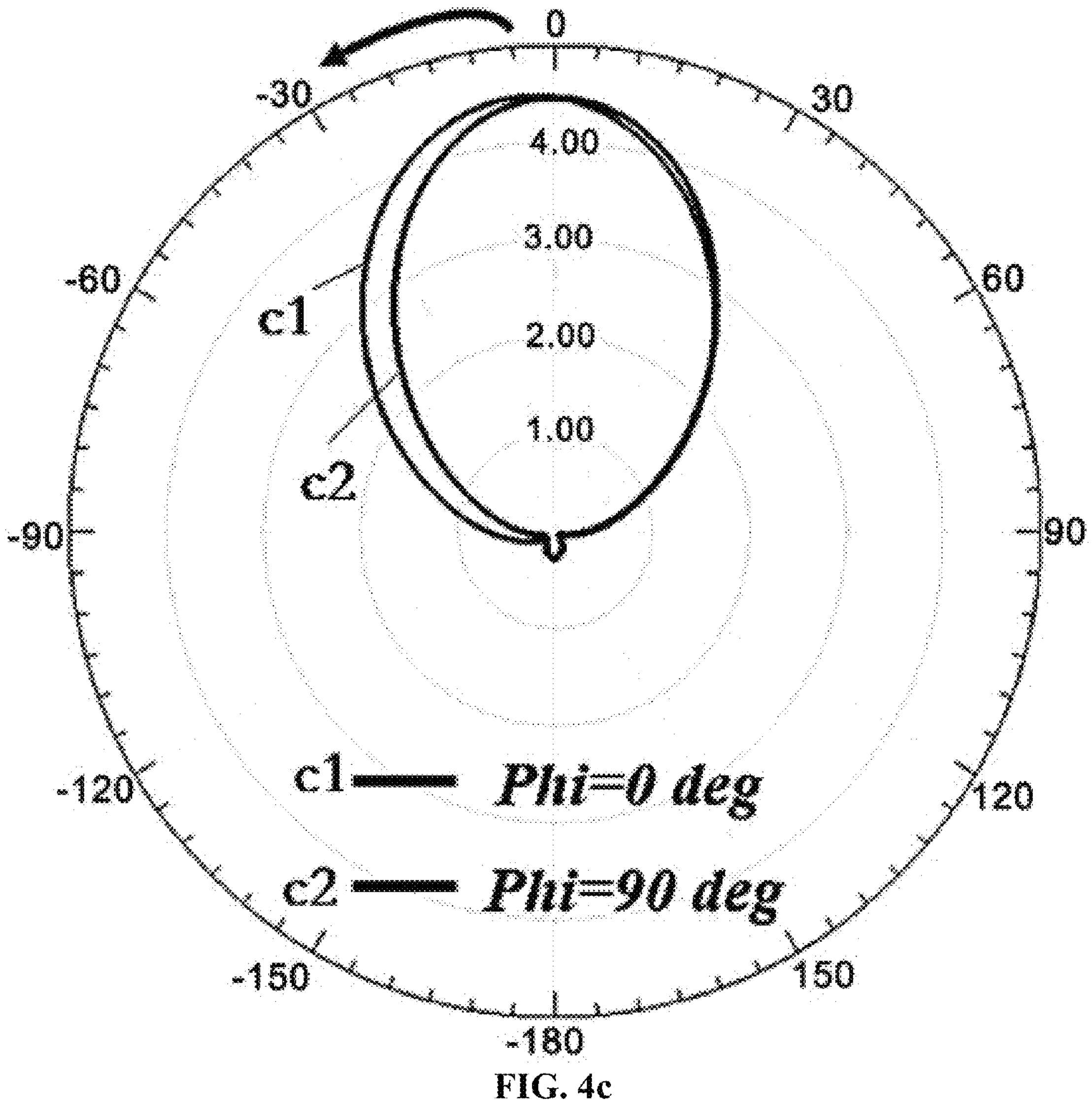
FIG. 4*c* is a schematic diagram of performance of a radiation pattern of the antenna in FIG. 4*a;*

No slot is disposed on the radiator in the antenna structure shown in FIG. 3*a*, and radiation of the antenna mainly depends on gap radiation between a pair of edges of the radiator 10 and the reference floor 20. For ease of description, two gaps for antenna radiation are respectively referred to as a gap A and a gap B. When the antenna structure is a symmetrical structure, current distribution on two edges of the radiator is equal in magnitude and same in phase. Therefore, a maximum radiation direction of a radiation pattern of the antenna structure is a normal direction, which may be specifically shown in FIG. 3*c*. In FIGS. 3*c*, *b*1 and *b*2 indicate deviation states at different angles. In this case, an asymmetric structure is designed, so that current distribution on two edges of the radiator 10 is different in phase, and there is a specific phase difference. Therefore, the radiation pattern can deviate, and a maximum radiation direction of the antenna is changed. The slot 11 may be disposed on one edge of the radiator 10. As shown in FIG. 4*a*, the gap A and the gap B differ in electric field magnitude, a current path of the gap B is relatively long and a phase is advanced, and a current path of the gap A is relatively short and a phase is delayed. Therefore, a radiation pattern deviates to a negative angle on a phi=0° plane, which may be simply summarized as deviating along an edge of a relatively small size, which may be specifically shown in FIG. 4*c*. In FIG. 4*c*, *c*1 and *c*2 indicate deviation states at different angles. Therefore, in a complex device environment, for a problem of deviation of a radiation pattern of an antenna caused by environmental asymmetry, the slot 11 may be disposed on one edge of the radiator 10 to correct the problem of deviation of the radiation pattern.

Figure 5A:
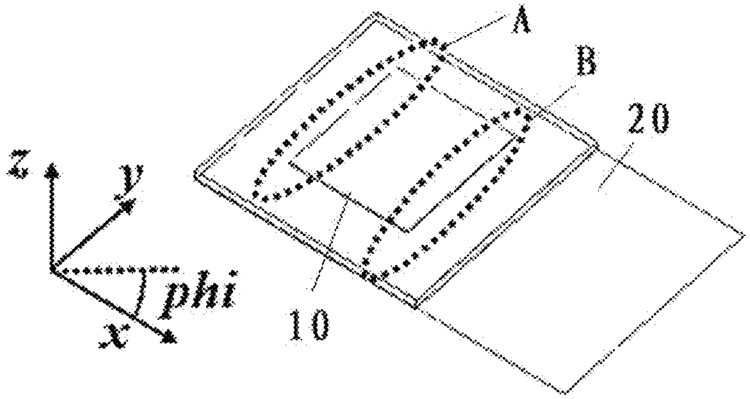
FIG. 5*a* is a schematic diagram of an antenna without a slot on a radiator.
Figure 5B:
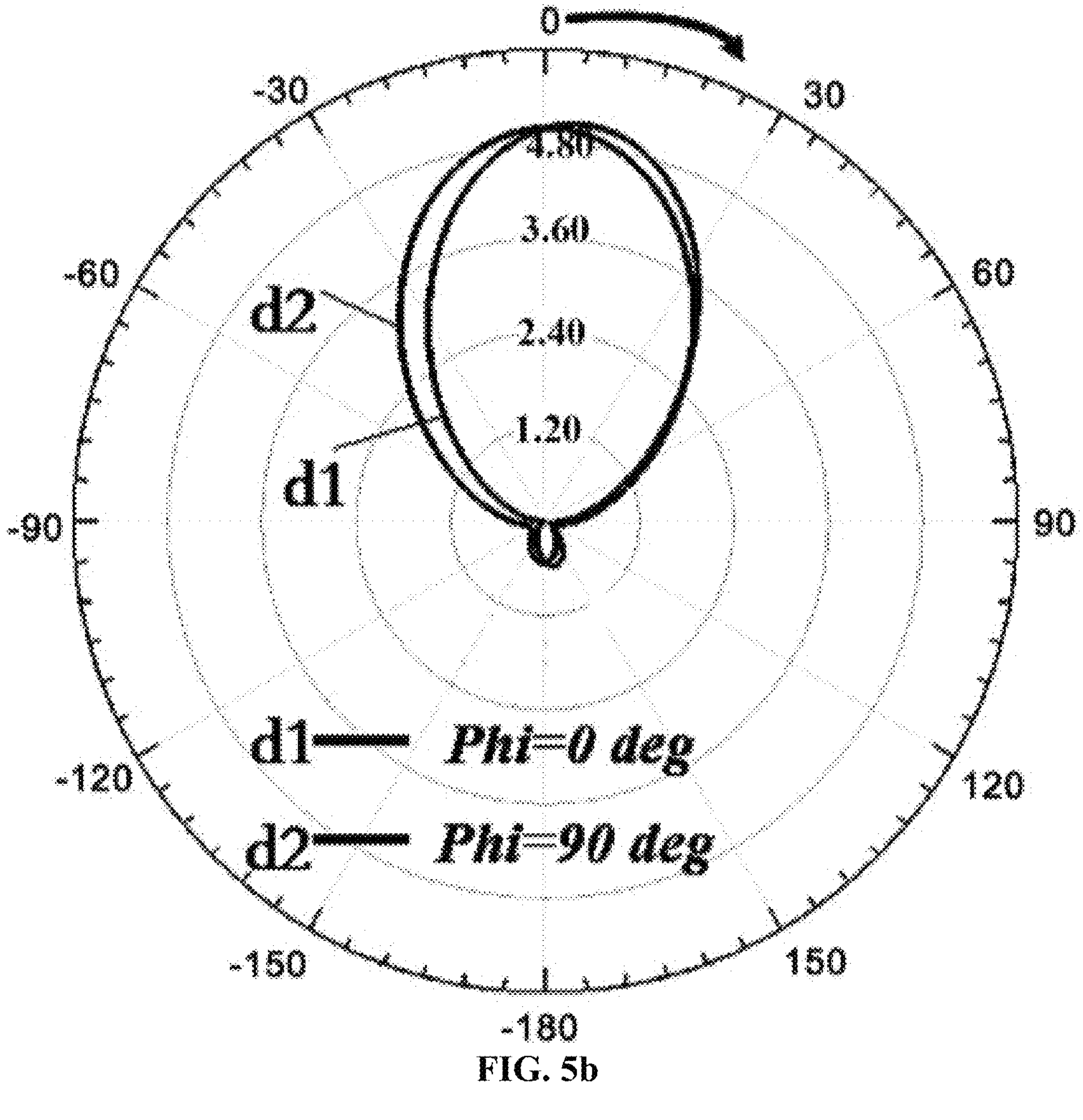
FIG. 5*b* is a schematic diagram of performance of a radiation pattern of the antenna in FIG. 5*a;*
Figure 5C:
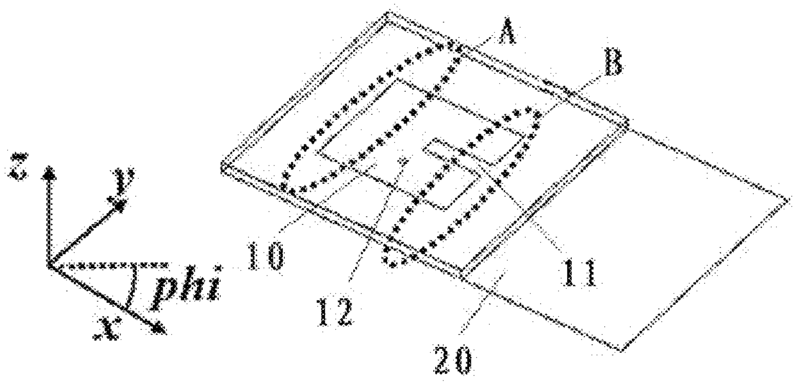
FIG. 5*c* is a schematic diagram of an antenna with a slot on a radiator.
Figure 5D:
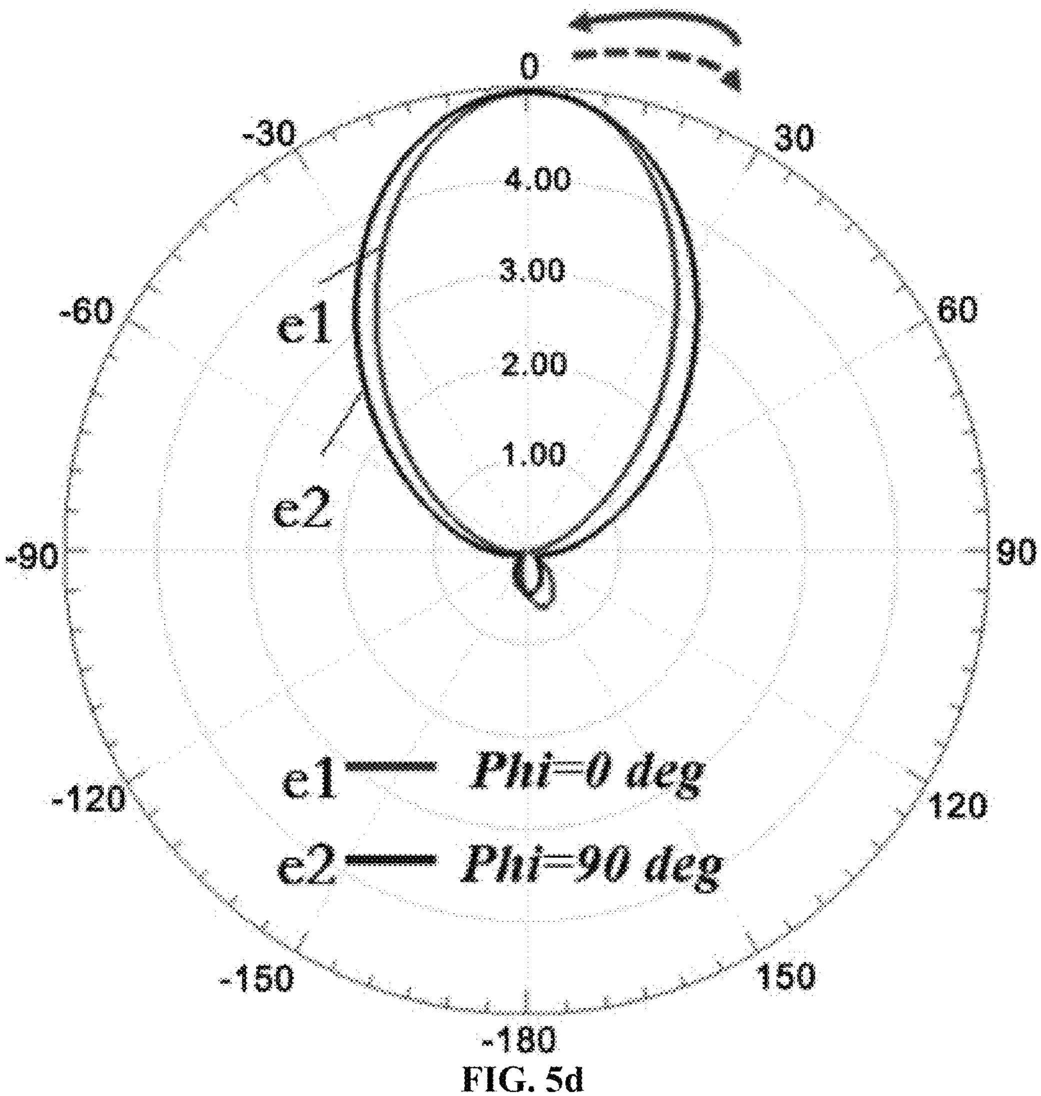
FIG. 5*d* is a schematic diagram of performance of a radiation pattern of the antenna in FIG. 5*c;*

FIG. 5*a* and FIG. 5*c* show an antenna structure with an asymmetric reference floor. No slot is disposed on a radiator in the antenna structure shown in FIG. 5*a*. A slot is disposed on a radiator in the antenna structure shown in FIG. 5*c*. In FIG. 5*b*, *d*1 and *d*2 indicate deviation states of a radiation pattern of the antenna structure in FIG. 5*a*. In FIG. 5*d*, *e*1 and *e*2 indicate deviation states of a radiation pattern of the antenna structure in FIG. 5*c*. As shown in FIG. 5*a*, in this case, the gap A is the same as the gap B, and the reference floor is asymmetric with respect to the antenna structure. Consequently, the radiation pattern of the antenna deviates in a positive angle direction on a phi=0° plane. For details, refer to FIG. 5*b*. According to the foregoing mechanism, as shown in FIG. 5*c*, the slot 11 is disposed on one edge of the radiator 10 of the antenna, and a path of the gap B is added, so that a radiation pattern of the antenna on the phi=0° plane deviates to a negative angle. Finally, under a neutralization action, a maximum radiation direction of the radiation pattern of the antenna is restored to the normal direction, which may be specifically shown in FIG. 5*d*.

Figure 6A:
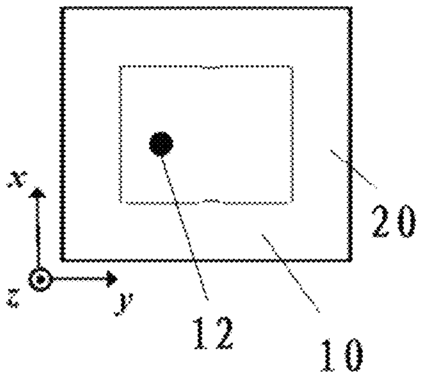
FIG. 6*a* is a schematic diagram of an antenna obtained when a feeding point is located at a symmetrical position of a radiator.
Figure 6B:
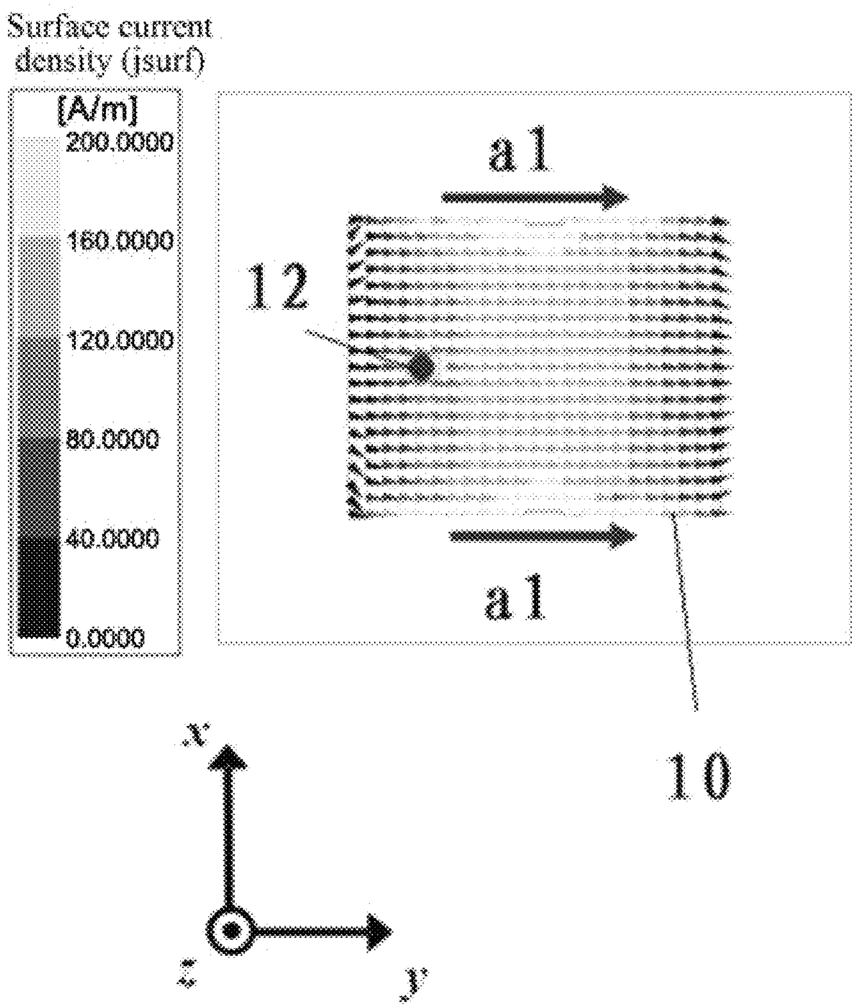
FIG. 6*b* is a schematic diagram of distribution of currents on the radiator in FIG. 6*a;*
Figure 6C:
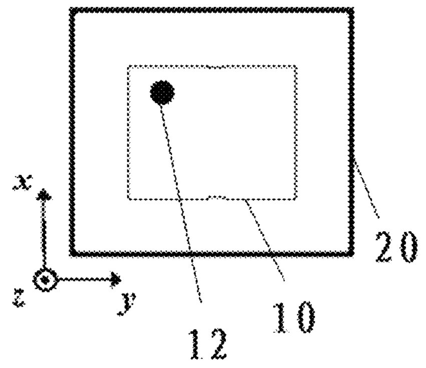
FIG. 6*c* is a schematic diagram of an antenna obtained when a feeding point is located at a corner position of a radiator.
Figure 6D:
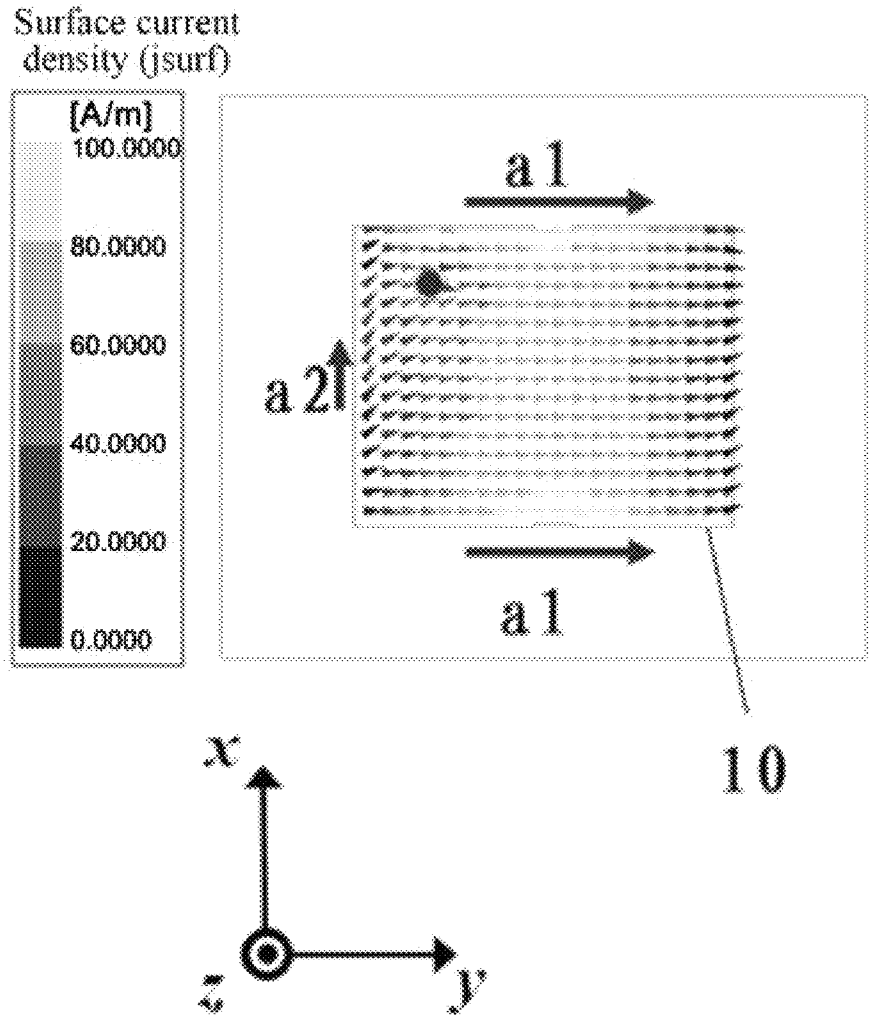
FIG. 6*d* is a schematic diagram of distribution of currents on the radiator in FIG. 6*c;*
Figure 6E:
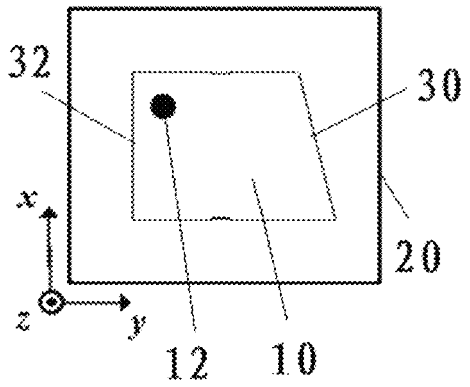
FIG. 6*e* is a schematic diagram of an antenna obtained when a feeding point is located at a corner position of a radiator.
Figure 6F:
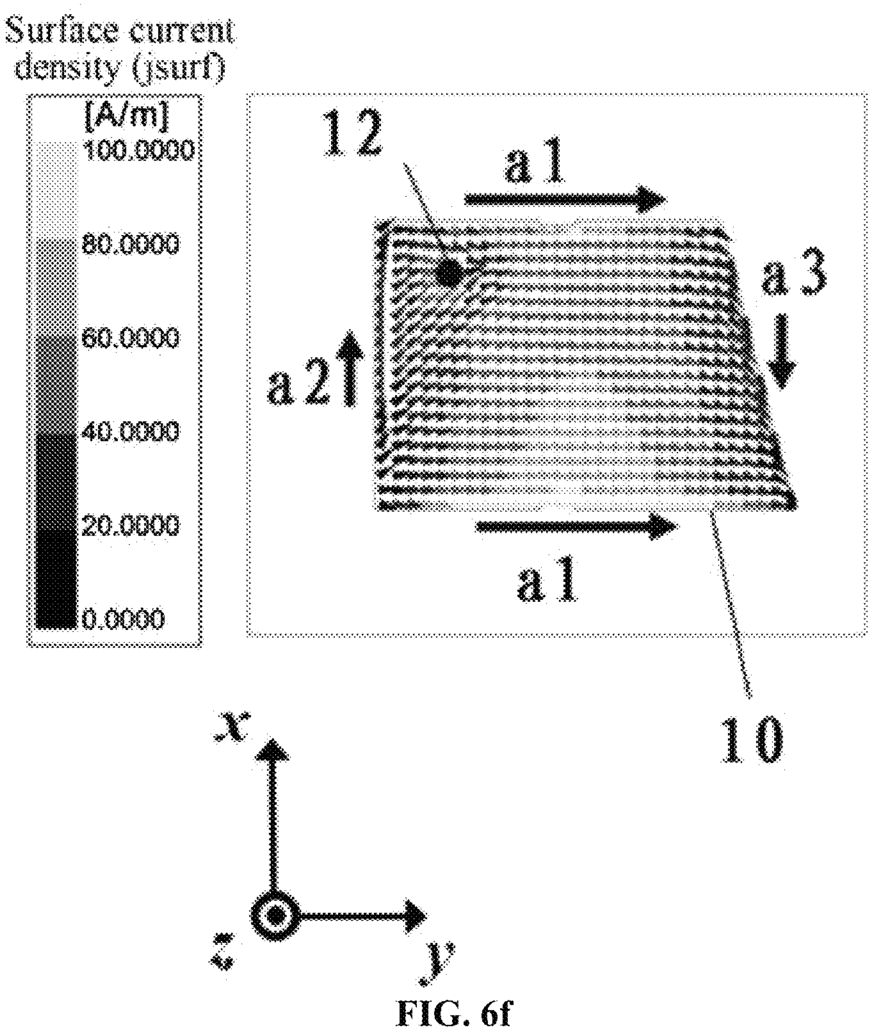
FIG. 6*f* is a schematic diagram of distribution of currents on the radiator in FIG. 6*e;*
Figure 7:
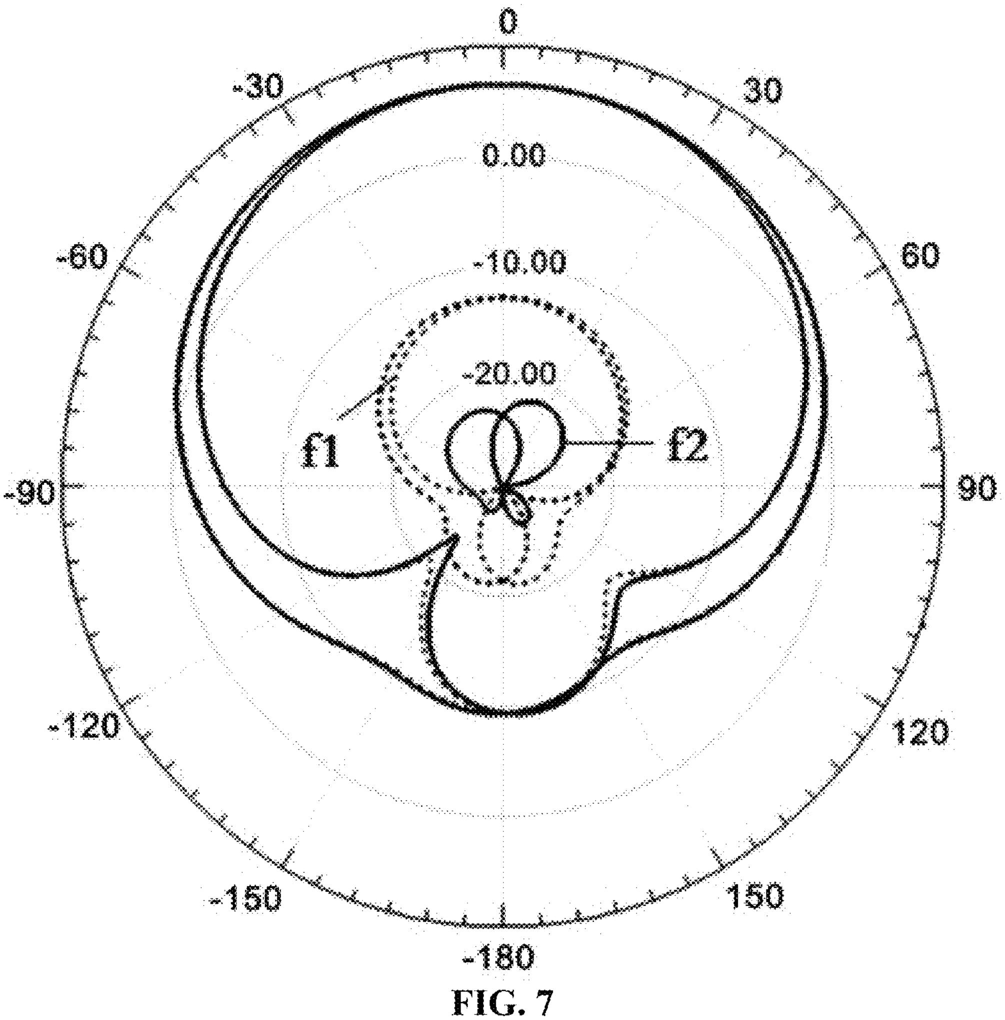
FIG. 7 is a schematic diagram of comparison of performance of radiation patterns of antennas.

FIG. 6*a* to FIG. 6*d* are schematic diagrams of feeding points in three antenna structures on a radiator and schematic diagrams of current distribution during working in a resonant mode. When feeding positions of the antenna structures are at symmetrical positions, cross-polarization is relatively low and polarization purity is relatively high. In this case, current distribution of antennas working in the resonant mode is well consistent. As shown in FIG. 6*a*, the feeding point is disposed at a symmetrical position of the radiator 10. As shown in FIG. 6*b*, currents are distributed in a ty direction (an a1 direction), and there is no current in an x direction. In this case, the antenna has extremely good polarization purity. However, in an environment of a terminal device, a feeding position of an antenna is often difficult to be disposed at such an ideal position. For example, as shown in FIG. 6*c*, a feeding point is disposed at a corner position of the radiator 10, and a feeding position is offset in a +x direction. As shown in FIG. 6*d*, when the antenna works in the resonant mode due to the offset of the feeding position, a current component in the +x direction (an a2 direction) is generated in current distribution, and the a2 direction represents a cross-polarization current, resulting in an increase in cross-polarization and a decrease in polarization purity. As shown in FIG. 6*e*, a feeding point is disposed at a corner position of a trapezoidal radiator 10. Polarization can be reduced by constructing the trapezoidal radiator. A direction of a current is changed by an oblique edge of the trapezoidal radiator 10 when the antenna works in the resonant mode. Reversed cross-polarization current (a current in an a3 direction) distribution is introduced. The current offsets the cross-polarization current, thereby reducing cross-polarization of the antenna and improving polarization purity, which may be specifically shown in FIG. 6*f*. Radiation patterns obtained when antennas shown in FIG. 6*c* and FIG. 6*e* work in the resonant mode may be shown in FIG. 7, where f1 represents a radiation pattern of the antenna shown in FIG. 6*c*, and f2 represents a radiation pattern of the antenna shown in FIG. 6*e*. It may be clearly seen that cross-polarization of the antenna decreases.

Figure 8A:
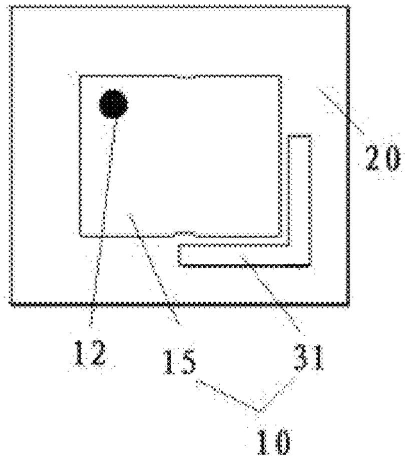
FIG. 8*a* is a schematic diagram in which a branch is disposed at a corner of a radiation body.
Figure 8B:
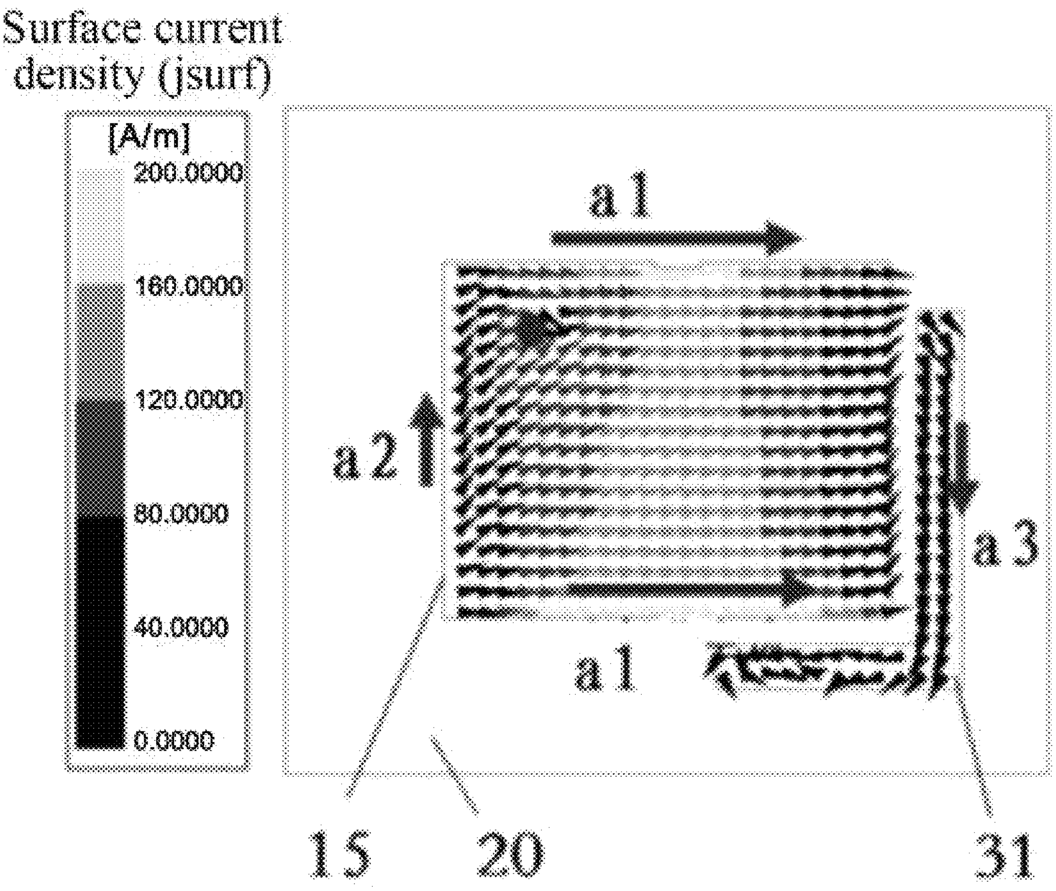
FIG. 8*b* is a schematic diagram of distribution of currents on a radiator in FIG. 8*a;*
Figure 9A:
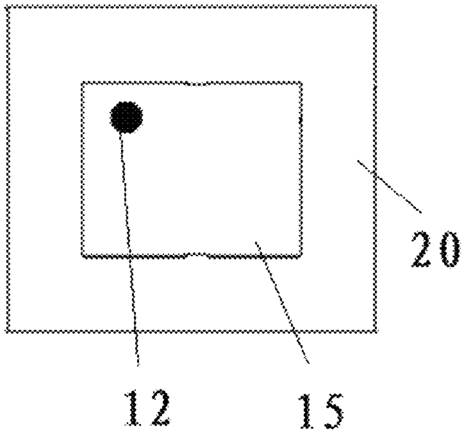
FIG. 9*a* is a schematic diagram in which no branch is disposed on a periphery of a corner region of a radiation body.
Figure 9B:
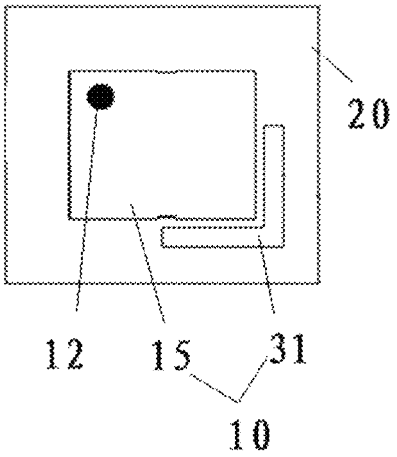
FIG. 9*b* is a schematic diagram in which a branch is disposed on a periphery of a corner region of a radiation body.
Figure 9C:
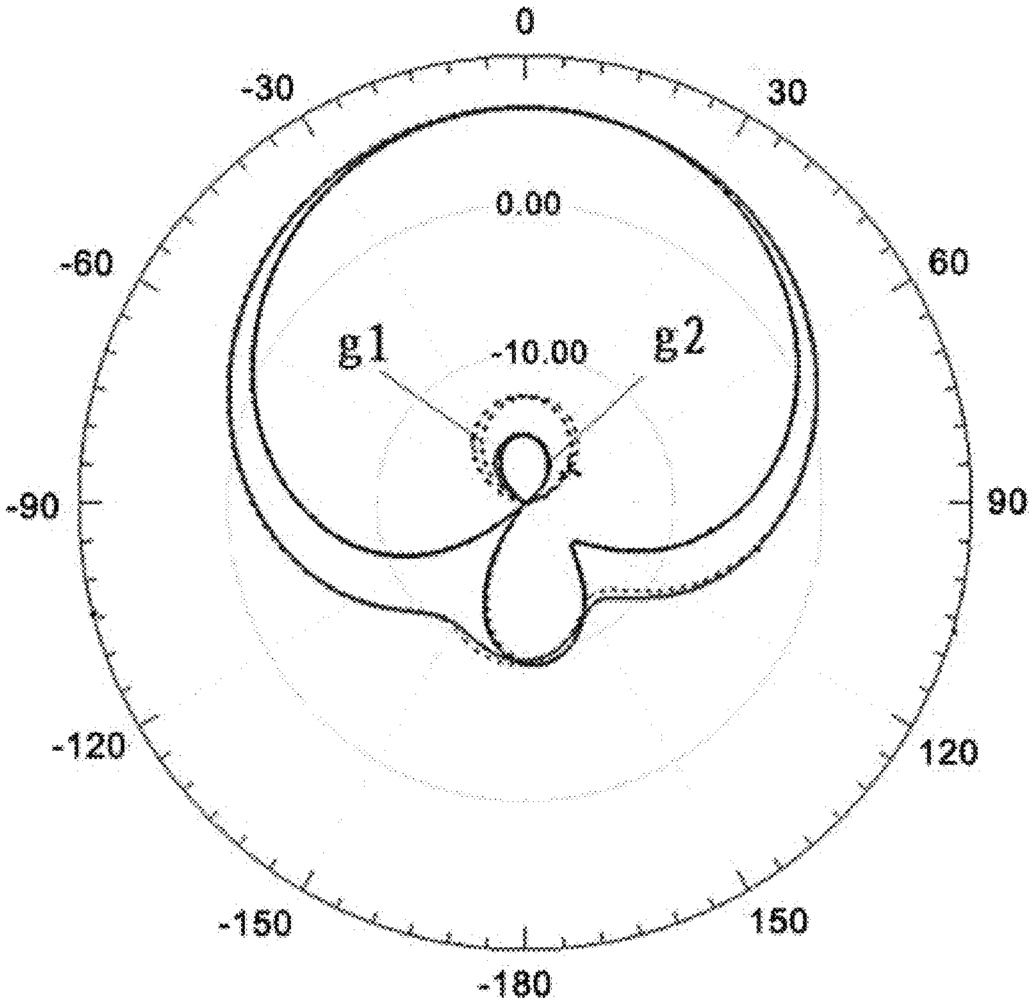
FIG. 9*c* is a schematic diagram of comparison of performance of radiation patterns of antennas.

Low cross-polarization can be implemented by deflecting the trapezoidal radiator 10 for feeding, and a reversed cross-polarization component is introduced by using an external structure to implement low cross-polarization of the antenna. As shown in FIG. 8*a*, a branch 31 may be disposed on a periphery of a corner region of the radiation body 15 in the radiator 10, and the branch 31 may be a metal member. An L-shaped branch 31 is introduced based on the antenna shown in FIG. 6*c*, which is specifically shown in FIG. 8*a*. The L-shaped branch 31 may introduce an anti-cross-polarization current (a current in an a3 direction) by generating current distribution under the coupling action. As shown in FIG. 8*b*, the anti-cross-polarization current offsets an original cross-polarization current (a current in the a2 direction), thereby improving cross-polarization. As shown in FIG. 9*a*, no branch 31 is disposed on the periphery of the corner region of the radiation body 15. As shown in FIG. 9*b*, the branch 31 is disposed on the periphery of the corner region of the radiation body 15 in the radiator 10. As shown in FIG. 9*c*, g1 represents a radiation pattern of an antenna in FIG. 9*b*, and g2 represents a radiation pattern of an antenna in FIG. 9*c*. A cross-polarization improvement effect is obvious.

The electronic device in the embodiments of this application includes the antenna structure in the foregoing embodiments. In the electronic device having the antenna structure described in the foregoing embodiments, the antenna structure has high polarization purity and good antenna performance.

In some embodiments, as shown in FIG. 1 to FIG. 2*e* and FIG. 10*a*, the electronic device may further include: a frame 40, a bracket 41, and a mainboard 42. The bracket 41 may be disposed on the frame 40. The reference floor 20 may be disposed on one side of the bracket 41, the radiator 10 may be disposed on the other side of the bracket 41, the reference floor 20 and the radiator 10 may be fixedly mounted on the bracket 41, the mainboard 42 may be disposed on a side that is of the reference floor 20 and that is away from the mainboard 42, and the feeding structure 13 is disposed on the mainboard 42. A through hole 21 may be disposed on the reference floor 20, and a part of the feeding structure 13 may be electrically connected to the radiator 10 through the through hole 21, so that the feeding structure 13 may be fed to the radiator 10. The feeding structure 13 may include a conductive spring 14, and the conductive spring 14 may be electrically connected to the radiator 10 through the through hole 21. The conductive spring 14 may be insulated from the reference floor 20.

Optionally, as shown in FIG. 1, the electronic device may further include: a shielding cover 43, where the shielding cover 43 is disposed on a side that is of the mainboard 42 and that is close to the reference floor 20. The shielding cover 43 may protect a component on the mainboard 42 from interference from an external signal. The shielding cover 43 may be spaced apart from the reference floor 20, and a proper spacing may be selected according to a specific structure of the device.

In this embodiment of this application, as shown in FIG. 1, the electronic device may further include: a display screen 44 and the cover 45. The cover 45 may be a battery cover, the display screen 44 and the cover 45 are disposed on the frame 40, the display screen 44 may be disposed on one side of the frame 40, the cover 45 may be disposed on the other side of the frame 40, and the bracket 41 and the mainboard 42 are located between the display screen 44 and the cover 45.

The embodiments of this application are described above with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. An antenna structure, comprising:

a reference floor; and a radiator, wherein the radiator and the reference floor are stacked and spaced apart, and the radiator comprises a feeding point and a first current distribution part and a second current distribution part that are respectively located at two ends of the radiator; wherein a cross-polarization current direction on the first current distribution part is opposite to a cross-polarization current direction on the second current distribution part under the effect of a feeding signal input on the feeding point;

wherein the radiator comprises a radiation body, the radiation body is a right trapezoid, and the feeding point is located in a right-angle corner region near an upper base of the radiation body or an acute-angle corner region near a lower base of the radiation body.

2. The antenna structure according to claim 1, wherein the radiator is a trapezoid, and the first current distribution part comprises an oblique edge region of the radiator.

3. The antenna structure according to claim 2, wherein a slot is disposed on an upper base edge or a lower base edge of the radiator.

4. The antenna structure according to claim 1, wherein the radiator further comprises a branch, the first current distribution part comprises the branch, the branch is coupled to the radiation body, and the branch is disposed in a corner region of the radiation body.

5. The antenna structure according to claim 4, wherein the radiation body is a rectangle, the feeding point of the radiation body is located in a corner region of the radiation body, and the branch is disposed around a periphery of the corner region in which the feeding point is located; and/or the branch is disposed around a periphery of a corner region opposite to the corner region in which the feeding point is located.

6. The antenna structure according to claim 4, wherein the branch is disposed on a periphery of at least one of the right-angle corner region or the acute-angle corner region.

7. The antenna structure according to claim 1, wherein a slot is disposed on an upper base edge or a lower base edge of the radiation body.

8. The antenna structure according to claim 1, wherein there are at least three radiators, and at least one radiator is correspondingly provided with the first current distribution part and the second current distribution part.

9. The antenna structure according to claim 8, wherein at least two radiators are disposed at intervals in a first region in a length direction of the first region, at least two radiators are disposed at intervals in a second region in a length direction of the second region, the first region and the second region overlap vertically, and the radiator in the first region and the radiator in the second region are a same radiator.

10. An electronic device, comprising an antenna structure, wherein the antenna structure comprises:

a reference floor; and a radiator, wherein the radiator and the reference floor are stacked and spaced apart, and the radiator comprises a feeding point and a first current distribution part and a second current distribution part that are respectively located at two ends of the radiator; wherein a cross-polarization current direction on the first current distribution part is opposite to a cross-polarization current direction on the second current distribution part under the effect of a feeding signal input on the feeding point;

wherein the radiator comprises a radiation body, the radiation body is a right trapezoid, and the feeding point is located in a right-angle corner region near an upper base of the radiation body or an acute-angle corner region near a lower base of the radiation body.

11. The electronic device according to claim 10, wherein the radiator is a trapezoid, and the first current distribution part comprises an oblique edge region of the radiator.

12. The electronic device according to claim 11, wherein a slot is disposed on an upper base edge or a lower base edge of the radiator.

13. The electronic device according to claim 11, further comprising:

a shielding cover, wherein the shielding cover is disposed on a side that is of the mainboard and that is close to the reference floor.

14. The electronic device according to claim 10, wherein the radiator further comprises a branch, the first current distribution part comprises the branch, the branch is coupled to the radiation body, and the branch is disposed in a corner region of the radiation body.

15. The electronic device according to claim 14, wherein the radiation body is a rectangle, the feeding point of the radiation body is located in a corner region of the radiation body, and the branch is disposed around a periphery of the corner region in which the feeding point is located; and/or the branch is disposed around a periphery of a corner region opposite to the corner region in which the feeding point is located.

16. The electronic device according to claim 14, wherein the branch is disposed on a periphery of at least one of the right-angle corner region or the acute-angle corner region.

17. The electronic device according to claim 10, wherein a slot is disposed on an upper base edge or a lower base edge of the radiation body.

18. The electronic device according to claim 10, wherein there are at least three radiators, and at least one radiator is correspondingly provided with the first current distribution part and the second current distribution part.

19. The electronic device according to claim 18, wherein at least two radiators are disposed at intervals in a first region in a length direction of the first region, at least two radiators are disposed at intervals in a second region in a length direction of the second region, the first region and the second region overlap vertically, and the radiator in the first region and the radiator in the second region are a same radiator.

20. The electronic device according to claim 10, further comprising:

a frame;

a bracket, wherein the bracket is disposed on the frame, the reference floor is disposed on one side of the bracket, and the radiator is disposed on the other side of the bracket; and a mainboard, wherein the mainboard is disposed on a side that is of the reference floor and that is away from the mainboard.

* * * * *